(12) United States Patent
Samuel et al.

(10) Patent No.: US 12,743,354 B2
(45) Date of Patent: Sep. 22, 2026

(54) SYSTEM AND METHOD FOR RECOMMENDING THROUGH AN ON THE BOX (OTB) ARTIFICIAL INTELLIGENCE (AI) PRODUCTIVITY TOOL TO REPLACE A MEMORY DEVICE TO AVOID OCCURRENCE OF A DETECTED ERROR

(71) Applicant: Dell Products LP, Round Rock, TX (US)

(72) Inventors: Balasingh Ponraj Samuel, Round Rock, TX (US); Daniel L. Hamlin, Round Rock, TX (US); Srikanth Kondapi, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 18 days.

(21) Appl. No.: 18/920,934

(22) Filed: Oct. 20, 2024

(65) Prior Publication Data

US 2026/0111322 A1 Apr. 23, 2026

(51) Int. Cl.
*G06F 11/20* (2006.01)

(52) U.S. Cl.
CPC .... *G06F 11/2094* (2013.01); *G06F 2201/805* (2013.01)

(58) Field of Classification Search
CPC ............... G06F 11/2094; G06F 11/201; G06F 11/2053; G06F 11/0793
USPC ................................ 714/6.11, 6.1, 6.2, 6.32
See application file for complete search history.

(56) References Cited

U.S. PATENT DOCUMENTS 8,380,714 B2 2/2013 Inagaki
8,548,951 B2 10/2013 Solmer
9,201,957 B2 12/2015 Turdakov
9,218,412 B2 12/2015 Wang
9,626,358 B2 4/2017 Danielyan
9,633,085 B2 4/2017 Kamotsky
(Continued)

FOREIGN PATENT DOCUMENTS

WO 2020/192587 A1 10/2020
WO 2021/050382 A1 3/2021
WO 2023/249666 A1 12/2023

*Primary Examiner* — Chae M Ko
(74) *Attorney, Agent, or Firm* — Prol Intellectual Property Law, PLLC; H. Kenneth Prol

(57) ABSTRACT

An information handling system executing computer readable code instructions for an on the box (OTB) artificial intelligence (AI) productivity tool may comprise a hardware processor executing computer-readable code instructions to access gathered natural language descriptions of application, firmware, and hardware capabilities, receive an error indicating a software, firmware, or hardware failure or malfunction, determine, via a trained neural network, determine that the error indicates imminent failure of a hard disk drive (HDD), generate a natural language description of a recommendation to replace the HDD, generate an intervention recommendation input intent value for the natural language description, and identify and execute a best match responsive capability for the received natural language description having a capability intent value that generates a highest semantic similarity search score generated through comparison of the intervention recommendation input intent value and a plurality of capability intent values generated from the gathered natural language descriptions.

20 Claims, 7 Drawing Sheets

(56) References Cited

U.S. PATENT DOCUMENTS 9,648,683 B2 5/2017 Kangyo
10,146,593 B2 12/2018 Gong
11,620,262 B2 4/2023 Lee
11,948,073 B2 4/2024 Zhang
2018/0365065 A1 12/2018 Guttman
2019/0391892 A1* 12/2019 Sabharwal .............. G06F 40/30
2020/0387550 A1 12/2020 Cappetta
2020/0394360 A1 12/2020 Dunn
2021/0216576 A1 7/2021 Staub
2021/0256207 A1 8/2021 Dunn
2021/0334194 A1 10/2021 Xiao
2021/0366506 A1 11/2021 Han
2021/0374353 A1 12/2021 Zhang
2021/0406113 A1* 12/2021 Chaiken .............. G06F 11/0793
2022/0035684 A1 2/2022 Gupte
2022/0035732 A1 2/2022 Xiao
2022/0092439 A1 3/2022 Liu
2022/0318502 A1 10/2022 Howell
2023/0105806 A1 4/2023 Dunn
2023/0222359 A1 7/2023 Panikkar
2023/0237263 A1 7/2023 Howell
2023/0251962 A1 8/2023 Xiao
2023/0267374 A1 8/2023 Polleri
2023/0336340 A1 10/2023 Polleri
2023/0409277 A1 12/2023 Sharifi
2023/0409567 A1* 12/2023 Guggulla .............. G06F 16/243
2024/0007414 A1 1/2024 Jain
2024/0036999 A1* 2/2024 Aurongzeb ........... G06F 9/5055
2024/0037346 A1 2/2024 Chorakhalikar
2024/0054318 A1 2/2024 Feltin
2024/0061719 A1 2/2024 Reddy
2024/0069770 A1 2/2024 Prabhakar
2024/0069959 A1 2/2024 Prabhakar
2024/0070113 A1 2/2024 Prabhakar
2024/0161003 A1 5/2024 Alexander
2024/0403662 A1* 12/2024 Schell .................... G06N 20/00

* cited by examiner

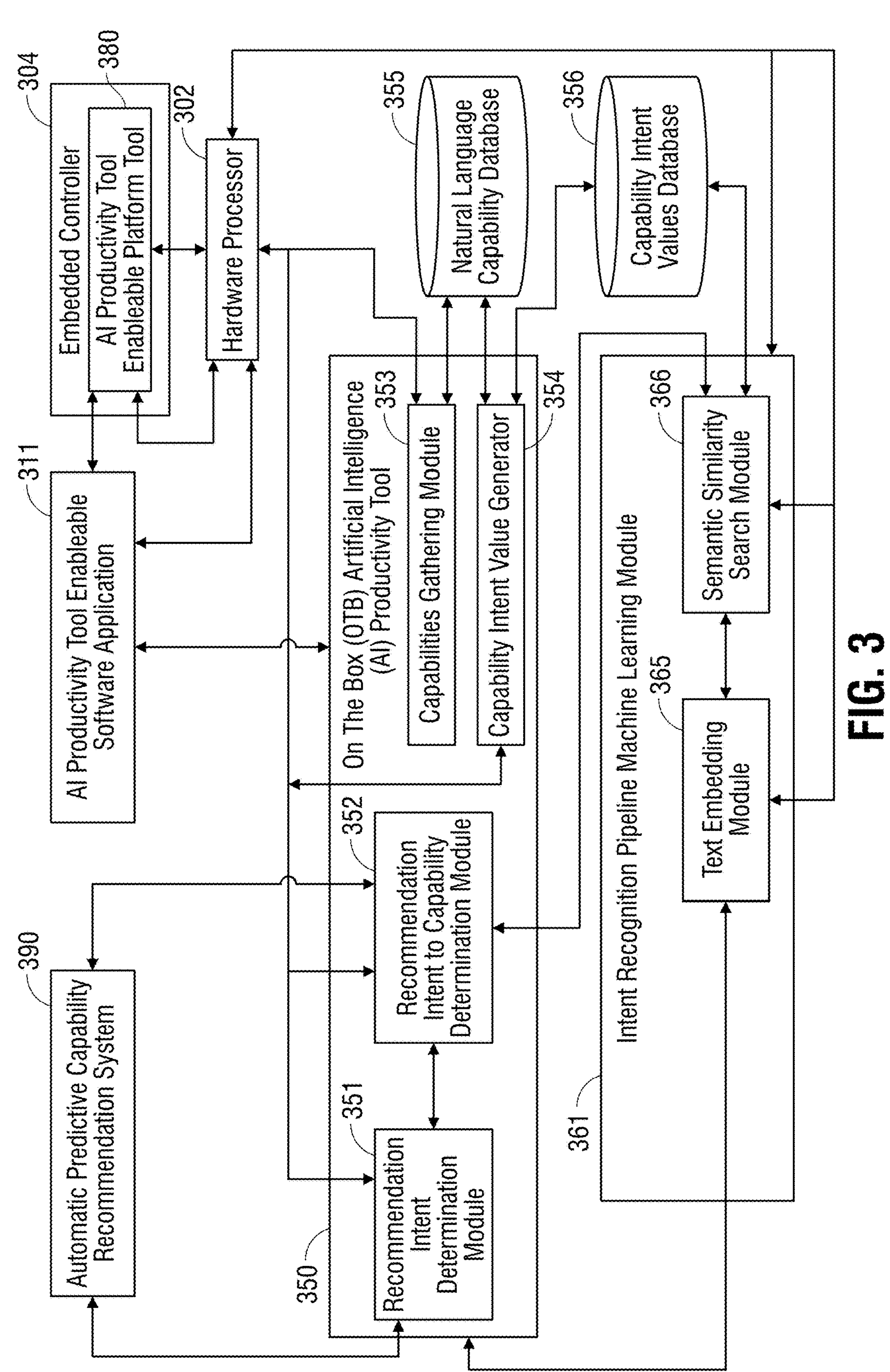
304
380
Embedded Controller
AI Productivity Tool Enableable Platform Tool
302
Hardware Processor
355
Natural Language Capability Database
356
Capability Intent Values Database
311
AI Productivity Tool Enableable Software Application
On The Box (OTB) Artificial Intelligence (AI) Productivity Tool
353
Capabilities Gathering Module
354
Capability Intent Value Generator
366
Semantic Similarity Search Module
365
Text Embedding Module
Intent Recognition Pipeline Machine Learning Module
361
352
Recommendation Intent to Capability Determination Module
351
Recommendation Intent Determination Module
350
390
Automatic Predictive Capability Recommendation System
FIG. 3

Figure 4:
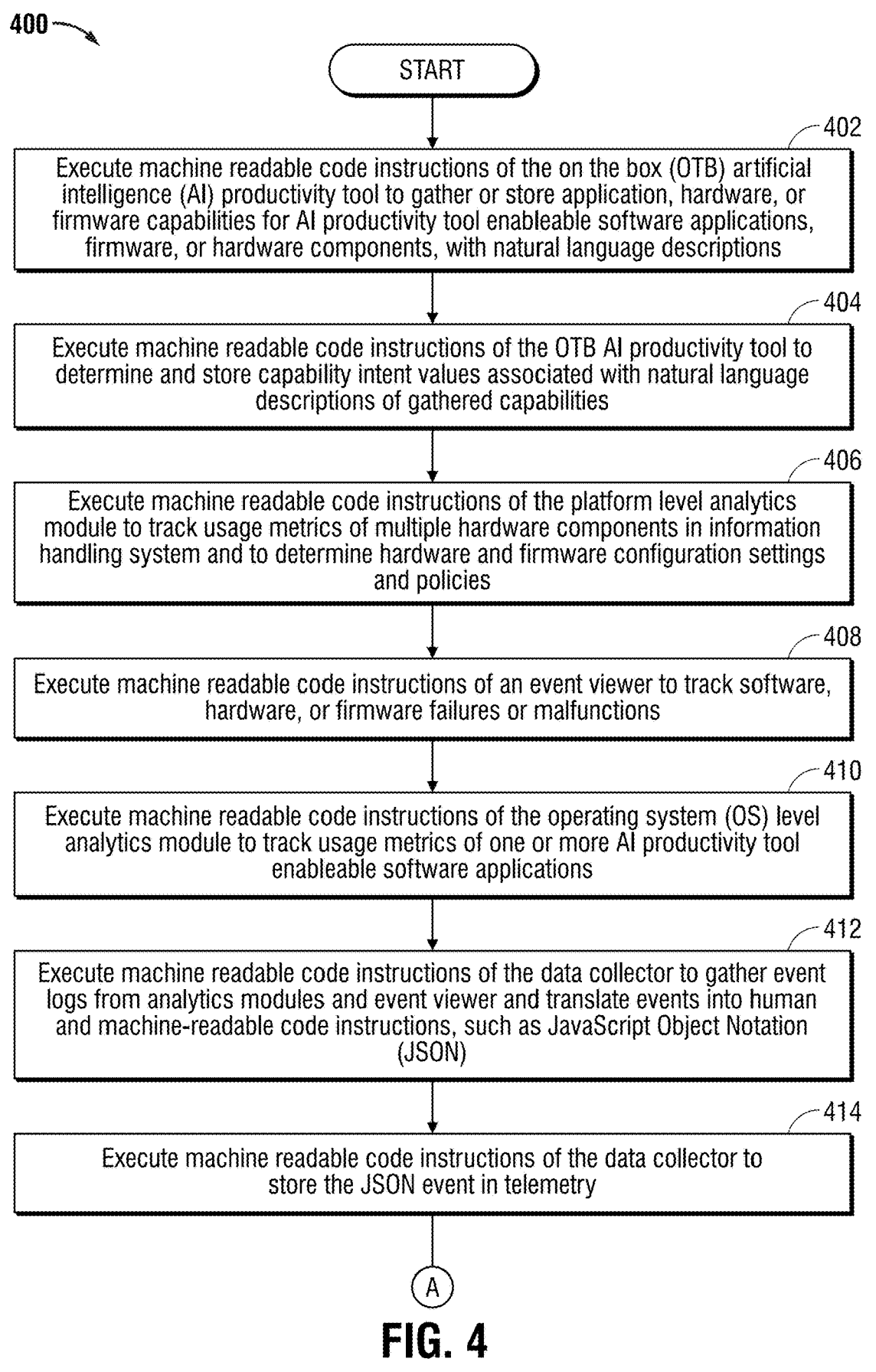

400

START

402: Execute machine readable code instructions of the on the box (OTB) artificial intelligence (AI) productivity tool to gather or store application, hardware, or firmware capabilities for AI productivity tool enableable software applications, firmware, or hardware components, with natural language descriptions 404: Execute machine readable code instructions of the OTB AI productivity tool to determine and store capability intent values associated with natural language descriptions of gathered capabilities 406: Execute machine readable code instructions of the platform level analytics module to track usage metrics of multiple hardware components in information handling system and to determine hardware and firmware configuration settings and policies 408: Execute machine readable code instructions of an event viewer to track software, hardware, or firmware failures or malfunctions 410: Execute machine readable code instructions of the operating system (OS) level analytics module to track usage metrics of one or more AI productivity tool enableable software applications 412: Execute machine readable code instructions of the data collector to gather event logs from analytics modules and event viewer and translate events into human and machine-readable code instructions, such as JavaScript Object Notation (JSON)

414: Execute machine readable code instructions of the data collector to store the JSON event in telemetry

Execute machine readable code instructions of Systems Internal Health Assessor (SIHA) to identify JSON event as indicating hardware, firmware, or software failure or malfunction

418

Execute machine readable code instructions of the classification supervised learning algorithm of the automatic predictive capability recommendation system to identify probability that an adjustable system configuration will co-occur in the future with a specific type of software, firmware, or hardware failure or malfunction

420

Execute machine readable code instructions of the Automatic predictive capability recommendation system to identify one or more recommended intervention actions of the information handling system for avoiding recurrence of the error, which may include an adjustable system configuration that is associated with a probability of future co-occurrence with the specific type of software, firmware, or hardware failure or malfunction that meets a preset failure probability threshold identified as an adjustable problematic system configuration

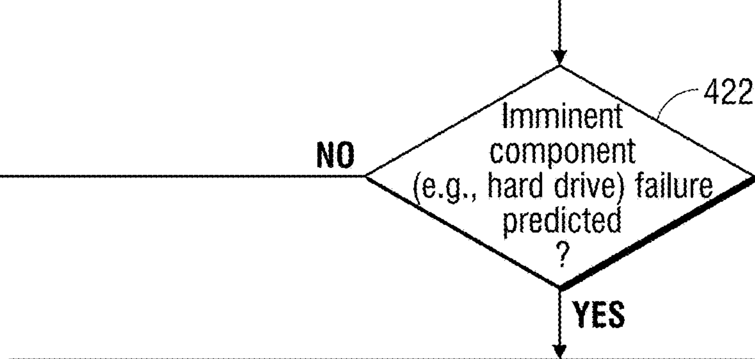

424

Execute machine readable code instructions of the automatic predictive capability recommendation system to associate adjustable problematic system configuration identifying component/hard drive replacement with recommendation to order new component/hard drive, backup system and user data to the cloud and to reboot into basic input output system (BIOS) mode for automatic network connectivity to cloud-based environment as remote terminal

426

Execute machine readable code instructions of the text generation module to generate natural language text for the one or more recommended intervention actions of the information handling system for avoiding recurrence of the error

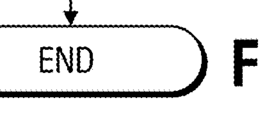

FIG. 4 (Continued)

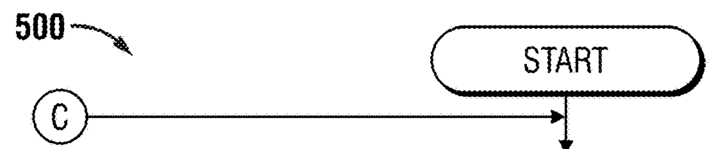

502

Execute machine readable code instructions of the automatic predictive capability recommendation system to transmit natural language text of the one or more recommended intervention actions of the information handling system for avoiding recurrence of the error and any associated recommendations to the recommendation intent to capability determination module

504

Execute machine readable code instructions of an OTB AI productivity tool text embedding module to generate a vector recommendation intent value for the received natural language text of the one or more recommended intervention actions of the information handling system for avoiding recurrence of the error and any associated recommendations

506

Execute machine readable code instructions of an OTB AI productivity tool semantic similarity search module to perform a semantic similarity search algorithm comparing the vector recommendation intent value against each of the plurality of capability intent values associated with AI productivity tool enableable software application or AI productivity tool enableable platform tool natural language capability descriptions

508

Execute machine readable code instructions of an OTB AI productivity tool recommendation intent to capability determination module to identify the AI productivity tool enableable software application natural language capability or hardware or firmware natural language capability having a highest or threshold semantic similarity search score as best match responsive capabilities for the received one or more recommended intervention actions of the information handling system for avoiding error recurrence or other recommendations

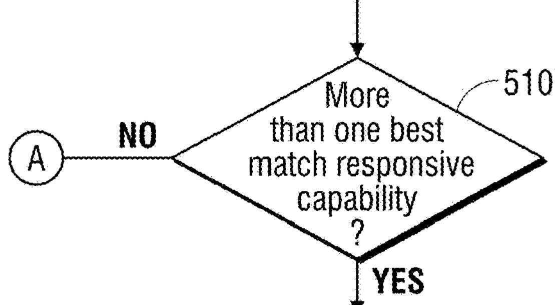

512

Execute machine readable code instructions of a machine learning model of automatic predictive capability recommendation system to determine a priority of execution for the plurality of best match capabilities

SYSTEM AND METHOD FOR RECOMMENDING THROUGH AN ON THE BOX (OTB) ARTIFICIAL INTELLIGENCE (AI) PRODUCTIVITY TOOL TO REPLACE A MEMORY DEVICE TO AVOID OCCURRENCE OF A DETECTED ERROR

CROSS REFERENCE TO RELATED APPLICATIONS

This application is a related to U.S. patent application Ser. No. 18/920,930, entitled "SYSTEM AND METHOD FOR PROMPTING AN INTERVENTION CAPABILITY FOR AN ARTIFICIAL INTELLIGENCE (AI) PRODUCTIVITY TOOL ENABLEABLE APPLICATION OR PLATFORM TOOL TO AVOID OCCURRENCE OF A DETECTED ERROR," filed on Oct. 20, 2024, invented by Balasingh Ponraj Samuel, et al., and assigned to the assignee hereof.

FIELD OF THE DISCLOSURE

The present disclosure generally relates to an on the box (OTB) artificial intelligence (AI) productivity tool executing at the operating system level that employs machine learning models stored at an information handling system for optimizing user productivity and information handling system performance in response to a received intervention recommendation input. The present disclosure more specifically relates to an agent of the OTB AI productivity tool executing at the firmware level to identify a software, firmware or hardware capability that may be executed in response to a received intervention recommendation input having a best match capability for avoiding recurrence of an identified error indicating failure or malfunction of hardware, firmware, or software, and to prompt confirmation to instruct software or firmware for the hardware associated with the best match capability to perform the responsive capability.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more artificial intelligence (AI) productivity tool enableable software applications, chat bots, or the like. Further, the information handling system may include an on the box (OTB) artificial intelligence (AI) productivity tool employing machine learning models stored locally at the information handling system, as installed by a manufacturer of the information handling system, for optimizing user productivity and information handling system performance.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a block diagram of a hardware processor executing machine readable code instructions for an on the box (OTB) AI productivity tool to instruct an AI productivity tool enableable software application or an AI productivity tool enableable platform tool to perform a best match capability for a recommended action to avoid error recurrence according to an embodiment of the present disclosure;

FIG. 4 is a flowchart showing a method of executing computer readable code instructions of an automatic predictive capability recommendation system to identify, prompt a user conversational interface, and execute a recommended action to avoid recurrence of a detected hardware, software, or firmware failure or malfunction according to an embodiment of the present disclosure.

The use of the same reference symbols in different drawings may indicate similar or identical items.

DETAILED DESCRIPTION OF THE DRAWINGS

Figure 1:
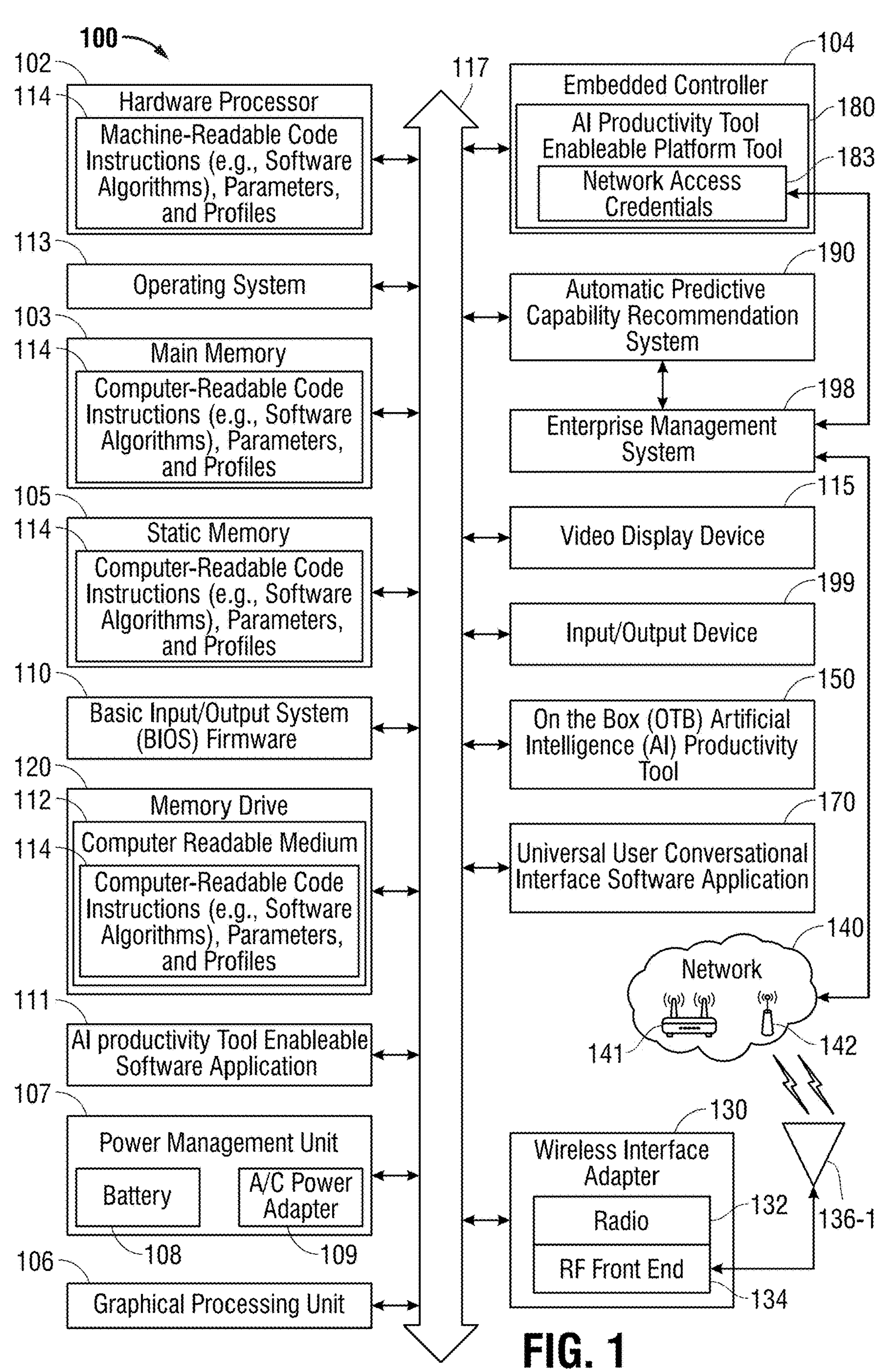
FIG. 1 is a block diagram of an information handling system executing machine readable code instructions for artificial intelligence (AI) productivity tool with an automatic predictive capability recommendation system for prompting a user to execute a intervention recommendation input responsive capability to avoiding error recurrence at the information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase the efficiency of computing systems and interactions with humans. An example of AI technologies includes, but is not limited to, chat-enabled environments (voice, text, etc.). These chat-enabled environments are described in embodiments herein as an on the box (OTB) AI productivity tool that receives this voice or text user query input from a user and implements a number of actions or utilizes services of various software applications based on the natural language of the user query input. In some information handling systems, the OTB AI productivity tool may interface with various AI productivity tool-enablable software applications operating at an operating system (OS) level, or AI productivity tool-enableable platform tools being executed at a platform level below the OS on the information handling system. These AI productivity tool-enablable software applications may integrate with the OTB AI productivity tool to allow user queries or inputs to trigger certain actions declared, supported, and managed by these AI productivity tool-enablable software applications. Further, the OTB AI productivity tool may work in tandem in embodiments herein with an automatic predictive capability recommendation system to recommend automatic execution of one or more capabilities for these AI productivity tool enableable software applications and platform tools in order prompt a user for user query input to avoid recurrence of a detected hardware, software, or firmware malfunction or error at the information handling system.

A hardware processor executing machine readable code instructions for an automatic predictive capability recommendation system in embodiments herein may perform a classification supervised learning algorithm across a pool of information, such as monitored and gathered telemetry data and error reporting, describing adjustable system configurations (e.g., software, firmware, or hardware usage and configurations) for the information handling system that have experienced hardware, firmware, or software failures in the past, to identify one or more recommended intervention actions of the information handling system for avoiding recurrence of the error. In some cases, these recommended intervention actions may take the form of one or more adjustments to adjustable system configurations that are determined to be likely to produce such failures in the future to avoid those failures.

In various embodiments, the hardware processor executing machine readable code instructions for the automatic predictive capability recommendation system may routinely monitor current telemetries recording adjustable system configurations of the information handling system in real time to detect occurrence of software, firmware, or hardware failures or malfunctions. When such an occurrence of software, firmware, or hardware failures or malfunctions are detected in current telemetry, the hardware processor executing machine readable code instructions for the automatic predictive capability recommendation system may conduct a capability similarity matching between generated descriptions of such telemetry failures and responsive capabilities to recommend one or more intervention actions of the information handling system for avoiding recurrence of the error, prior to its occurrence. In a further aspect, the OTB AI productivity tool may prompt the user via a universal user conversational interface, by voice or text, to notify and seek user query input, such as confirmation, to execute one or more responsive intervention actions in embodiments herein.

These recommended intervention actions in embodiments herein may statistically correlate, via a semantic or lexical similarity comparison for example, to one or more capabilities of the AI productivity tool enableable software applications or platform tools. As a consequence, the hardware processor executing code instructions of the automatic predictive capability recommendation system may identify a best match capability for performing the recommended intervention action to avoid recurrence of detected hardware, firmware, or software, engage in a user chat, via a universal user conversational interface software application, a prompt to receive user approval in a user query input for execution of such a best match capability. The execution of computer readable code instructions of an automatic predictive capability recommendation system works in tandem with the OTB AI productivity tool to execute such a best match capability. In such a way, the automatic predictive capability recommendation system may communicate, in a conversational interface using human understandable language or text, instruction prompts to notify a user or request for approval to automatically perform recommended intervention actions at the information handling system to avoid recurrence of hardware, software, or firmware failures, prior to their occurrence.

These processes include gathering, either in real-time or prior to execution of either the OTB AI productivity tool, firmware or hardware capabilities for a plurality of hardware components or an AI productivity tool platform tool and capabilities associated with each of a plurality of AI productivity tool-enablable software applications that may operate as recommended intervention actions for various types of errors or failures. These AI productivity tool-enablable software applications and AI productivity tool platform tool capabilities may describe those functionalities of each of the hardware components and each of the AI productivity tool-enablable software applications, respectively, that may be used when interfacing with the OTB AI productivity tool. The natural language descriptions of the AI productivity tool-enablable software application capabilities and AI productivity tool platform tool capabilities that may serve as recommended intervention actions for various types of errors or failures may be stored within a natural language hardware capability for a semantic search comparison to received intervention recommendation inputs generated by the automatic predictive capability recommendation system. The received intervention recommendation inputs generated by the automatic predictive capability recommendation system, in example embodiments, operate to identify a AI productivity tool-enablable software application capability or AI productivity tool platform tool capability most likely to address the received intervention recommendation inputs as recommended intervention actions for various types of errors or failures.

The hardware processor or another processor such as an embedded controller operating at the platform level below the OS may execute machine readable code instructions of a platform level analytics module to track usage metrics of multiple hardware components in the information handling system and to determine hardware and firmware configuration settings and policies. Metrics of hardware components may indicate when a failure or malfunction of the hardware component has occurred, such as when the hardware component is drawing too much power, operating at a high temperature, or experiencing multiple failures to perform. The hardware processor operating at the OS level may also execute machine readable code instructions of an event viewer to track software, hardware, or firmware failures or malfunctions. Additionally, the hardware processor executing at the OS level may execute machine readable code instructions of the OS level analytics module to track usage metrics of one or more AI productivity tool enableable software applications. Hardware and firmware configuration settings and policies may be analyzed upon identification of such malfunction or failure in order to predict a cause of such failures or malfunctions.

In order to perform such an analysis, the hardware processor may execute machine readable code instructions of a data collector to gather event logs from analytics modules and an event viewer and translate these events into human and machine-readable code instructions, such as JavaScript Object Notation (JSON). Such a reformatting may assist in generating natural language text descriptions of the malfunctions, failures, and any proposed or recommended intervention actions that may be performed or approved by a user to avoid recurrence of such errors. The hardware processor may further execute machine readable code instructions of a Systems Internal Health Assessor (SIHA) to identify a JSON event as indicating hardware, firmware, or software failure or malfunction. Upon identification of such a JSON event, the SIHA may transmit or communicate the JSON event indicating hardware, firmware, or software failure or malfunction to the automatic predictive capability recommendation system for recommendation of an intervention action that may be performed in order to avoid recurrence of such a failure or malfunction in the future.

The hardware processor in embodiments may execute machine readable code instructions of a classification supervised learning algorithm of the automatic predictive capability recommendation system to identify a probability that an adjustable system configuration will co-occur in the future with a specific type of software, firmware, or hardware failure or malfunction. This may be done in order to recommend adjustment of this adjustable system configuration as a recommended intervention action for avoiding recurrence of the error. Such a process may include use of a trained neural network having an input layer that includes all information given within the JSON event identified as notifying the SIHA of a software, hardware, or firmware failure, including usage metrics, policies, and configurations of hardware components, an AI productivity tool enableable platform tool, and various AI productivity tool enableable software applications. The output for such a trained neural network may include one or more recommended intervention actions to be performed by the user or by the OTB AI productivity tool to avoid recurrence of such a detected error in the future. These one or more recommended intervention actions may include, in various embodiments herein, an adjustable system configuration that is associated with a probability of future co-occurrence with the specific type of software, firmware, or hardware failure or malfunction that meets a preset failure probability threshold identified as an adjustable problematic system configuration.

In a specific example, in which the hardware processor executing machine readable code instructions of the automatic predictive capability recommendation system determines that the error identified by the SIHA indicates imminent failure of a hard drive, the hardware processor may execute machine readable code instructions of the automatic predictive capability recommendation system to recommend that the user order a new hard drive. The intervention recommendations generated by the automatic predictive capability recommendation system in such an embodiment may further include a recommendation to automatically backup the system and user data to the cloud, and to reboot into basic input output system (BIOS) mode for automatic network connectivity to cloud-based environment as remote terminal. Further, the hardware processor executing machine readable code instructions for the automatic predictive capability recommendation system in such a scenario may recommend automatically generating a purchase order for a replacement hardware component, and setting a flag to automatically boot into basic input output system (BIOS) mode upon restarting of the information handling system, to facilitate BIOS level network connection to the cloned OS for the information handling system in order to ensure that failure of the hardware component does not impact productivity of the user. In support of such remote accessibility, the hardware processor executing machine readable code instructions for the automatic predictive capability recommendation system may recommend retrieving network access credentials that may be used to provision the network interface device for network connection to the cloned OS for the information handling system while the information handling system is operated in BIOS mode, at the platform level, below the OS.

The hardware processor in embodiments may then execute machine readable code instructions of the text generation module to generate natural language text for the one or more recommended intervention actions of the information handling system for avoiding recurrence of the error. The hardware processor executing machine readable code instructions for the automatic predictive capability recommendation system may work in tandem with the text generation module, the recommendation intent to capability determination module of the OTB AI productivity tool, and the universal software application conversational interface to identify and execute a user-approved capability or function of the AI productivity tool enableable software application or the AI productivity tool enableable platform tool to perform the recommended intervention action. The first step in this process may include the hardware processor executing machine readable code instructions of the text generation module to generate a natural language text description for each of the one or more recommended intervention actions of the information handling system for avoiding recurrence of the error determined by the automatic predictive capability recommendation system. The recommendation intent to capability determination module may generate a vectorized recommendation intent value for each of these natural language descriptions, and compare these vectorized recommendation intent values against a plurality of capability intent values stored in the capability intent values database for capabilities of the AI productivity tool enableable software application and the AI productivity tool platform tool. Such a comparison may yield a best match capability for each of the natural language descriptions of the recommended intervention actions of the information handling system for avoiding recurrence of the error, if available. In such a way, the automatic predictive capability recommendation system may identify code instructions for the AI productivity tool enableable software application or for the AI productivity tool enableable platform tool that may be automatically executed, with user approval by the OTB AI productivity tool to perform the recommended intervention action for avoiding recurrence of the error indicating failure or malfunction of hardware, firmware, or software identified above.

Upon receipt of an intervention recommendation input at the OTB AI productivity tool executing at the operating system, a hardware processor executing code instructions of the OTB AI productivity tool at the OS level in embodiments herein may match the received intervention recommendation inputs to known capabilities of one or more of the AI productivity tool-enableable software applications or AI productivity tool enableable platform tool through execution by the hardware processor of machine readable code instructions for one or more natural language processing machine learning models executing at the operating system. For example, the hardware processor executing code instructions of the OTB AI productivity tool in embodiments herein may match the received intervention recommendation inputs to known capabilities of one or more of the AI productivity tool-enableable software applications or the AI productivity tool-enableable platform tool through execution by the hardware processor of machine readable code instructions for a semantic search methodology.

As a first step in such a semantic search methodology, a hardware processor executing machine readable code instructions for a capability intent value generator of the OTB AI productivity tool at the OS level may determine capability intent values associated with the natural language descriptions of the gathered capabilities for each of a plurality of AI productivity tool-enablable software applications or the AI productivity tool-enableable platform tool. These capability intent values are a mathematical representation of capability operations or services from various AI productivity tool-enablable software applications or the AI productivity tool-enableable platform tool in embodiments herein for use in semantic search similarity comparison methodologies. These capability intent values may be represented by a mathematical value in a multi-axis vector space that may be associated with a natural language description for that capability. In an embodiment, the capabilities may be associated with an identification (ID) such as an alphanumeric ID that also may be stored within a capability intent values database. Generating such capability intent values as vectors may be a first step in a natural language processing method to determine and correlate the intervention recommendation input that takes into account the context or semantics of the words used within the intervention recommendation input with one of a plurality of capabilities.

The hardware processor executing machine readable code instructions for a recommendation intent to capability determination module in embodiments herein may then compare the vectorized intervention recommendation input intent value and the capability intent values stored within the capability intent values database. Such a comparison may be performed using a semantic search machine learning model, such as a cosine similarity search that compares the distance or value difference in a multi-axis vector space between two vectors (e.g., the capability intent value vector and the intervention recommendation input value vector) to determine the contextual similarity between the natural language description of the capability and the natural language intervention recommendation input. Such a contextual or semantic search methodology may take into account the fact that the same word may have two meanings or consider synonyms of words, for example.

This may be performed for several of the capability intent values stored within the capability intent value database to identify a capability intent value that most closely matches the intervention recommendation input value. In such a way, a hardware processor executing code instructions for the recommendation intent to capability module for the OTB AI productivity tool may take relevance and context of natural language within an intervention recommendation input into account when determining a matching capability of an AI productivity tool enableable software application or the AI productivity tool-enableable platform tool that is most likely to address the intervention recommendation input. The natural language capability for an AI productivity tool enableable software application or the AI productivity tool-enableable platform tool having the highest semantic similarity search score may then be identified, via execution of machine readable code instructions of the recommendation intent to capability determination module by the hardware processor as the best match capability most likely to address the user's intended request within the natural language intervention recommendation input.

The hardware processor may then execute machine readable code instructions of the text generation module to generate a natural language text recommendation user confirmation request for confirmation from the user, via the universal user conversational interface software application in natural language, to automatically initiate execution of the identified best match capability or capabilities. Upon receipt of such a user approval, the hardware processor may execute code instructions for the automatic predictive capability recommendation system and for the OTB AI productivity tool in embodiments herein to instruct the AI productivity tool-enableable software application or AI productivity tool-enableable platform tool associated with the best match capability to perform the best match capability.

Turning now to the figures, FIG. 1 illustrates an information handling system 100 similar to the information handling systems according to several aspects of the present disclosure. As described herein, artificial intelligence (AI) is a developing technology that is used to increase efficiency of computing systems, such as information handling system 100, and interactions with humans. An example of AI technologies includes, but is not limited to, chat-enabled environments (voice, text, etc.). These chat-enabled environments are described in embodiments herein as computer-readable code instructions 114 for an on the box (OTB) AI productivity tool 150 that receives this voice or text input from a user, via a universal user conversational interface software application 170, and implements a number of actions or utilizes services of various software applications based on the natural language of the input. Such software applications may include, for example, an AI productivity tool enableable software application 111 operating within an operating system (OS) 113 of the information handling system, or an AI productivity tool enableable platform tool 180 having machine readable code instructions that may be executed by an embedded controller 104 at a platform level, below the OS 113, for adjustment or actions with components controlled via the platform level. These AI productivity tool-enablable software applications 111 and the AI productivity tool enableable platform tool 180 may integrate with the OTB AI productivity tool 150 to allow user queries or inputs to trigger certain actions declared, supported, and managed by these AI productivity tool-enablable software applications 111 or AI productivity tool enableable platform tool 180. Further, the OTB AI productivity tool 150 may work in tandem with an automatic predictive capability recommendation system 190 to recommend automatic execution of one or more capabilities for these AI productivity tool enableable software applications 111 and platform tool 180 most likely to address the received intervention recommendation inputs as recommended intervention actions in order to avoid recurrence of a detected hardware, software, or firmware malfunction or error at the information handling system 100.

A hardware processor 102 executing machine readable code instructions for an automatic predictive capability recommendation system 190 in an embodiment may perform a classification supervised learning algorithm across a pool of information describing adjustable system configurations (e.g., software, firmware, or hardware usage and configurations) for the information handling system 100, and other information handling systems within an enterprise that are in contact with an enterprise management system 198, that have experienced hardware, firmware, or software failures in the past. This may be performed in order to identify one or more recommended intervention actions of the information handling system 100 for avoiding the recurrence of the error. The enterprise management system 198 in an embodiment may also be in communication with the automatic predictive capability recommendation system 190 to communicate benchmark testing performed at the enterprise management system (e.g., 198 of FIG. 1) for each of a plurality of information handling systems, including 100, as described in greater detail below with respect to FIG. 2.

In an embodiment, the hardware processor 102 executing machine readable code instructions for the automatic predictive capability recommendation system 190 may feed the telemetry of monitored events and component or software function on information handling system 100 and identified as containing an error indicating hardware, firmware, or software failure or malfunction into a trained neural network of the automatic predictive capability recommendation system 190 in an embodiment. The trained neural network of the automatic predictive capability recommendation system 190 executes to determine a recommended intervention action of the information handling system 100 for avoiding recurrence of the error. Such a trained neural network may be trained at the enterprise management system (e.g., 198 of FIG. 1) based on telemetries received from a plurality of information handling systems, including 100, over time in some embodiments. In a specific example in which the automatic predictive capability recommendation module recommends an intervention action that requires the information handling system to communicate with a remote instance or clone of the OS 113 via the network interface device 130, as described in greater detail below with respect to FIG. 2, the enterprise management system 198 may also be in communication with the AI productivity tool enableable platform tool 180, executing at the BIOS 110, below the OS 113 to provision the network interface device 130 with network credentials 183 that will facilitate such network communication at the BIOS 110 level.

In some cases, these recommended intervention actions may take the form of one or more remediating adjustments to adjustable system configurations that were determined likely to produce such failures in the future. In various embodiments, the hardware processor 102 executing machine readable code instructions for the automatic predictive capability recommendation system 190 may routinely monitor current telemetries recording adjustable system configurations of the information handling system 100 hardware components, such as hardware processors (e.g., CPU 102, GPU 106, VPU, or embedded controller 104), memory devices (e.g., main memory 103, static memory 105, or memory drive 120), power management unit 107, video display device 115, other input/output (IO) device 199, or wireless interface device 130, as well as various AI productivity tool enableable software applications 111, the OS 113, or BIOS 110 in real time to detect occurrence of software, firmware, or hardware failures or malfunctions. When such an occurrence of software, firmware, or hardware failures or malfunctions are detected in current telemetry, the hardware processor 102 executing machine readable code instructions for the automatic predictive capability recommendation system 190 may execute the trained neural network with such various inputs to output a recommended one or more intervention actions of the information handling system 100 for avoiding recurrence of the error, prior to its occurrence.

These recommended intervention actions in embodiments herein may then be statistically correlated to one or more responsive capabilities of the AI productivity tool enableable software applications 111 or platform tool 180 via a semantic or lexical similarity comparison of generated description of the recommended intervention actions and the one or more responsive capabilities. As a consequence, the hardware processor 102 executing code instructions of the automatic predictive capability recommendation system 190 may identify a best match responsive capability for performing the recommended intervention action to avoid recurrence of detected hardware, firmware, or software in some embodiments. Further, the automatic predictive capability recommendation system 190 engages in a user chat, via a universal user conversational interface software application 170 to prompt a user with notification of the error and recommended intervention actions as well as prompt for user approval for execution of such a best match responsive capability in embodiments herein. The universal user conversational interface software application 170, therefore, works in tandem with the OTB AI productivity tool 150 to generate recommended intervention actions and to notify, confirm, and execute a best match responsive capability to avoid error recurrence. In such a way, the automatic predictive capability recommendation system 190 may communicate, in a conversational interface 170 using human understandable language or text, instructions to notify a user of errors and prompt requests for approval to automatically perform recommended intervention actions from responsive capabilities at the information handling system 100 to avoid recurrence of hardware, software, or firmware failures, prior to their occurrence.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of computer readable code instructions to perform one or more computer functions, via one or more hardware processing resources.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, other hardware controllers, or any combination thereof. Additional components of the information handling system 100 may include one or more storage devices such as static memory 105 or drive unit 120. The information handling system 100 may include or interface with one or more communications ports for communicating with external devices, as well as an input/output (IO) device 199, a video/graphics display device 115, or any combination thereof. Portions of an information handling system 100 may themselves be considered information handling systems 100.

Information handling system 100 may include devices or modules that embody one or more of the hardware devices or hardware processing resources executing machine readable code instructions for one or more systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood that any or all portions of machine readable code instructions (e.g., software or firmware algorithms), parameters, and profiles 114 may operate on a plurality of information handling systems 100. In a specific embodiment, machine readable code instructions for the OTB AI productivity tool 150, a universal user conversational interface software application software application 170, a AI productivity tool enableable platform tool 180, and one or more AI productivity tool enableable software applications 111 may execute locally at the information handling system 100, or on the box.

The information handling system 100 may include the hardware processor 102 such as a central processing unit (CPU) or other hardware processing resources. Any of the hardware processing resources may operate to execute machine readable code instructions 114 that are either firmware or software code. Moreover, the information handling system 100 may include memory such as main memory 103, static memory 105, and disk drive unit 120 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, EC 104, GPU 106, or any other hardware processing device. The information handling system 100 may also include one or more buses 117 operable to transmit communications between the various hardware components such as any combination of various I/O devices 199, 115, as well as between hardware processors 102, an EC 104, GPU 106 or other, the operating system (OS) 111, the basic input/output system (BIOS) 110, the wireless interface adapter 130, or a radio module 132, among other components described herein. In an embodiment, the hardware processor 102, EC 104, and/or GPU 106 may execute one or more bus drivers in order to transmit this data between the information handling system 100 and the input/output devices 199 described herein. As described herein, the information handling system 100 further includes a video/graphics display device 115. The video/graphics display device 115 in an embodiment may function as a liquid crystal display (LCD), an organic light emitting diode (OLED), a flat panel display, or a solid-state display. It is appreciated that the video/graphics display device 115 may be wired or wireless and may be an external video/graphics display device 115 that allows a user to increase the desktop area by extending the desktop in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna RF front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130.

The information handling system 100 may include a set of instructions 114 that may be executed to cause the computer system to perform any one or more of the methods or computer-based functions disclosed herein. For example, machine readable code instructions 114 may be executed by a hardware processor 102, GPU 106, EC 104 or any other hardware processing resource and may include software agents, or other aspects or components used to execute the methods and systems described herein. Various software modules comprising application machine readable code instructions 114 may be coordinated by an OS 113, and/or via an application programming interface (API) include a unified device API described herein. An example OS 113 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 120 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 120 during execution by the hardware processor 102, EC 104, or GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 120 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 120, the hardware processor 102 (e.g., CPU), the EC 104, the GPU 106, a video/graphic display device 115, or other wired I/O devices 199 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 105 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
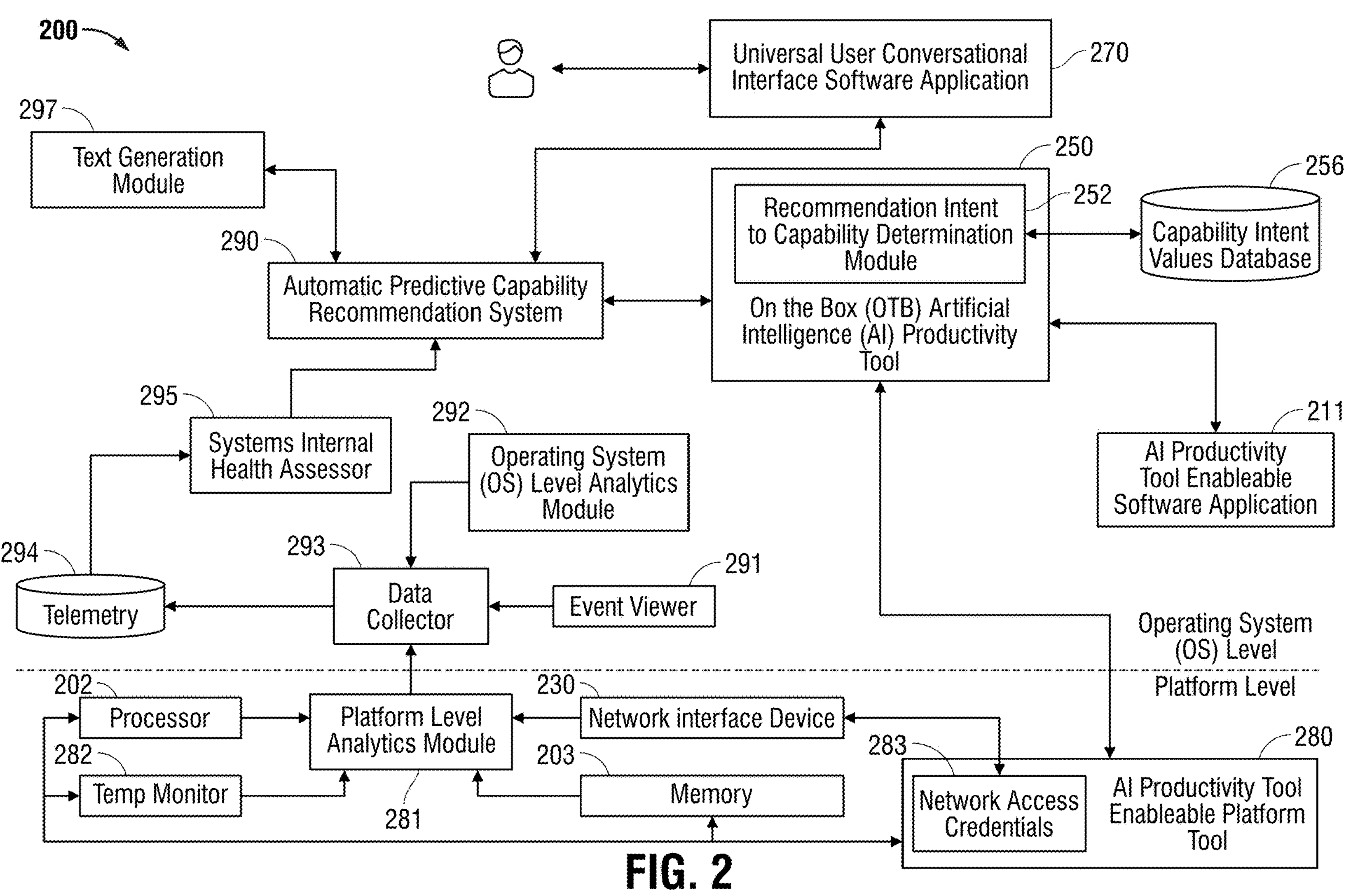
FIG. 2 is a block diagram of an information handling system with computer readable code instructions of an automatic predictive capability recommendation system to identify, prompt a user conversational interface, and execute a recommended action to avoid recurrence of a detected hardware, software, or firmware failure or malfunction according to an embodiment of the present disclosure.

FIG. 2 is a block diagram illustrating an information handling system 200 executing computer readable code instructions of an automatic predictive capability recommendation system to identify and execute a recommended action of the information handling system to avoid recurrence of a detected error indicating a hardware, software, or firmware failure or malfunction according to an embodiment of the present disclosure. A hardware processor 202 executing machine readable code instructions for an automatic predictive capability recommendation system 290 on information handling system 200 in an embodiment may perform a classification supervised learning algorithm across a pool of telemetry data including error notification data and information describing adjustable system configurations (e.g., software, firmware, or hardware usage and configurations) for the information handling system 200 that have experienced hardware, firmware, or software failures in the past in an embodiment. The automatic predictive capability recommendation system 290 in an embodiment performs a classification supervised learning algorithm to identify one or more recommended intervention actions of the information handling system 200 for avoiding recurrence of the error, where such errors may take the form in some embodiments of one or more adjustable system configurations that may be likely to produce such failures in the future.

In some cases, this pool of information may include crowd-sourced data received at an enterprise management system (e.g., 198 of FIG. 1) platform from a plurality of information handling systems, including 200, within an enterprise that have similarly experienced hardware, firmware, or software failures in the past. In various embodiments, the hardware processor 202 executing machine readable code instructions for the automatic predictive capability recommendation system 290 may routinely monitor current telemetries recording adjustable system configurations of the information handling system 200 in real time to detect occurrence of software, firmware, or hardware failures or malfunctions. When such an occurrence of software, firmware, or hardware failures or malfunctions are detected in current telemetry, the hardware processor 202 executing machine readable code instructions for the automatic predictive capability recommendation system 290 may one or more intervention actions of the information handling system 200 for avoiding recurrence of the error, prior to its occurrence.

The information handling system 200 in an embodiment may include a plurality of hardware components. For example, the information handling system 200 in an embodiment may include a network interface device 230, a hardware processor 202 (e.g., central processing unit (CPU), graphics processing unit (GPU), or visual processing unit (VPU)), a memory 203, and a temperature monitor 282 or other system sensor devices. A platform level analytics module 281 in an embodiment may be in communication with various hardware components (e.g., 202, 203, 230) and firmware for those components and other components in the information handling system 200. The hardware processor 202 executing machine readable code instructions for the platform level analytics module 281 may monitor power consumption by each of the various hardware components (e.g., 202, 203, 230) by a PMU in an embodiment, as well as thermal measurements made by the temperature monitor 282 at various locations throughout the information handling system 200. Additional sensor devices may be monitored as well in embodiments of the present disclosure. The hardware processor 202 executing machine readable code instructions for the platform level analytics module 281 in an embodiment may further track or monitor for firmware or hardware malfunctions or failures, including malfunctions or failures of the AI productivity tool enableable platform tool 280.

In another example embodiment, the hardware processor 202 executing machine readable code instructions for the platform level analytics module 281 may also access firmware for hardware components (e.g., 202, 203, 230) to determine policies or settings for those components at the time of such power measurements, temperature measurements, or other sensor device measurements. More specifically, the hardware processor 202 executing machine readable code instructions for the platform level analytics module 281 in an embodiment may determine whether a network interface device 230 is transceiving according to WLAN, WWAN, Bluetooth®, or Near Field Communication (NFC) standards, as well as policies setting a preference for one type of standard over another, or restrictions on power consumption, data rate, or frequencies used by the network interface device 230. In another example, the hardware processor 202 executing machine readable code instructions for the platform level analytics module 281 in an embodiment may determine current usage as a percentage of total capacity for the hardware processor 202 (e.g., central processing unit (CPU), graphics processing unit (GPU), or visual processing unit (VPU)). In still another example, the hardware processor 202 executing machine readable code instructions for the platform level analytics module 281 may determine current usage as a percentage of total capacity for memory 203, time required to process requests to access such memory 203, and identify software applications most frequently accessing such memory 203. All information accessed in such a way by the hardware processor 202 executing machine readable code instructions for the platform level analytics module 281 in an embodiment may be communicated to a data collector 293.

The hardware processor 202 executing machine readable code instructions for the platform level analytics module 281 in an embodiment may also be capable of adjusting such policies within firmware for one or more hardware components, upon user approval. For example, the hardware processor 202 executing machine readable code instructions for the platform level analytics module 281 in an embodiment may instruct hardware driver for a network interface device 230 to transceive according to the Bluetooth®, rather than WLAN or WWAN, or reset policies for the network interface device 230 to restrict power consumption, data rate, or frequencies used.

In an embodiment, the hardware processor 202 executing machine readable code instructions for the platform level analytics module 281 may also be capable of determining the current versions of drivers for various hardware components (e.g., 202, 203, 230). In some embodiments, the hardware processor 202 executing machine readable code instructions for the platform level analytics module 281 may receive updated drivers, direct installation of those drivers, or pause repeated attempts at unsuccessful driver installations in order to increase efficiency of associated hardware components (e.g., 202, 203, 230). In other embodiments, the hardware processor 202 executing machine readable code instructions for the platform level analytics module 281 may also identify and delete obsolete or redundant files associated with previously replaced or obsolete drivers, and track power consumed during installation or updating of such drivers. In still other embodiments, the hardware processor 202 executing machine readable code instructions for the platform level analytics module 281 may further determine power consumed during updates made to various software applications executing via the hardware processor 202 (e.g., CPU, GPU, or VPU).

As described above, the platform level analytics module 281 may be in communication with a data collector 293, which may also be in communication with an operating system (OS) level analytics module 292. The hardware processor 202 executing machine readable code instructions for the OS level analytics module 292 in an embodiment may further track or monitor for software application malfunctions or failures, including malfunctions or failures of one or more of the AI productivity tool enableable software applications 211, software drivers, or other software applications. In an embodiment, the hardware processor 202 executing machine readable code instructions for the OS level analytics module 292 may monitor and adjust execution of software applications within the operating system (OS) for the information handling system 200. The hardware processor 202 executing machine readable code instructions for the OS level analytics module 292 in an embodiment may further track which software applications are running or idle (e.g., executing in the background) at various times, and track current versions of software applications and times at which updates to such software applications are performed. In still another example, the hardware processor 202 executing machine readable code instructions for the OS level analytics module 292 may determine current usage as a percentage of total capacity for memory 203, time required to process requests to access such memory 203, and identify software applications most frequently accessing such memory 203. Information gathered by the hardware processor 202 executing machine readable code instructions for the OS level analytics module 292 in such an embodiment may be communicated to the data collector 293.

The hardware processor 202 executing machine readable code instructions for the OS level analytics module 292 in an embodiment may further direct operation of certain AI productivity tool enableable software applications 211, based on user approval. For example, the hardware processor 202 executing machine readable code instructions for the OS level analytics module 292 in an embodiment may cap the percentage of total capacity for the hardware processor 202 or the memory 203 that may be used by specifically identified software applications, or terminate AI productivity tool enableable software applications 211 submitting repeated interrupts to the CPU 202. As another example, the hardware processor 202 executing machine readable code instructions for the OS level analytics module 292 in an embodiment may terminate or cap the percentage of total capacity for the hardware processor 202 or memory 203 that may be used by idle or background software or firmware applications.

As described herein, the hardware processor 202 executing machine readable code instructions for the data collector module 261 in an embodiment may gather data regarding hardware and firmware configuration and functionality and power consumption from the platform level analytics module 281 and data regarding software performance and hardware processor/memory usage from the OS level analytics module 292. In some embodiments, the hardware processor 202 executing machine readable code instructions for the data collector 293 may also gather information from an event viewer 291 (e.g., Microsoft® Event Viewer) tracking computing events relating to software, firmware, and hardware in real-time. Such events may include notification of errors relating to various attempted processes at the information handling system 200.

More specifically, the hardware processor 202 executing machine readable code instructions for the event viewer 291 in an embodiment may record one or more Windows Hardware Error Architecture (WHEA) events indicating a hardware error. Such WHEA events may be associated with data packets that specifically identify the hardware component (e.g., 202, 203, 230, or others as shown in FIG. 1) producing the error. The hardware processor 202 executing machine readable code instructions for the data collector 293 may routinely collect information from each of the platform level analytics module 281, the OS level analytics module 292 or the event viewer 291 at preset intervals, or may do so upon notification by one of these modules (e.g., 281, 292, or 291) of a specific event, failure, or warning, such as a temperature measurement from temperature monitor 282 exceeding a preset maximum temperature threshold value. In another embodiment, the specific event, failure, or warning may include indication that a warning that the operating system encountered a critical error and performed an automatic shut down or blue screen event. In another embodiment, the specific event, failure, or warning may include indication that the error included multiple forced restarts of the operating system within a preset time period. In a further embodiment, the specific event, failure, or warning may include indication that a fan is drawing power above a preset fan power draw maximum. In yet another embodiment, the specific event, failure, or warning may include indication that multiple retries to save to a drive memory or static memory are required or that several bad sectors have reached a threshold for the drive memory or static memory.

Information and data recorded by the hardware processor 202 executing machine readable code instructions for the event viewer 291 for various events or telemetry in an embodiment may be output in the form of a log, while information recorded by the platform level analytics module 281 or the OS level analytics module 292 may be output into reports. The format of such a log or report may vary, which may require reformatting of such information into an easily classified, sorted, and searchable format. Thus, the hardware processor 202 executing machine readable code instructions for the data collector 293 in an embodiment may operate a large language model machine learning algorithm to reformat any received logs or reports into a predetermined data interchange format in plain text such as JavaScript Object Notation (JSON), or Extensive Markup Language (XML) for such events or hardware, software, or firmware status. Specific examples described herein may use the JSON format for consistency and ease of explanation, but any other type of existing or later developed predetermined data interchange format may be used in various embodiments for the logs or reports of error events, telemetry, configuration, and status of hardware components, software, or firmware.

Such a JSON-formatted report or log may be referred to herein as a JSON event. Each JSON event may include any information gathered from the platform level analytics module 281, OS level analytics module 292, or event viewer 291 and a time stamp associated with either the time the analytics module report was generated, or the time at which a WHEA (or other known convention for categorizing processing events) error occurred. In some cases, a JSON event may include a single WHEA error (e.g., hardware processor error), or a single notification or warning from an analytics module (e.g., temperature monitor 282 recorded a temperature exceeding a preset maximum temperature threshold value). In other cases, a JSON event may include routinely gathered information such as current configurations or policies for various hardware components (e.g., 202, 203, 230) or software applications, power consumption of those components over a known monitoring time period, current versions of drivers or software applications, and timestamps for installation of updates to such drivers or software applications.

Such a JSON event may include an event ID, a source for the event (e.g., platform level analytics module 281, OS level analytics module 292, or event viewer 291), a timestamp for that event, one or more custom flags identifying the errors, notifications, or warnings, and one or more device current states, identifying the software and hardware configurations. The JSON event may further include any number of other errors, notifications, warnings, hardware configurations, software performance analytics, or descriptions of policies in place for hardware or software at the information handling system 200, as monitored by either the platform level analytics module 281 or the OS level analytics module 292. Some JSON events in an embodiment may indicate a hardware failure, such as "WHEA_error," having a value of CPU, indicating a failure at the CPU. In embodiments where a JSON event indicating a hardware error identified by the systems internal health assessor (SIHA) 295 appear, the JSON event may comprise a failure operational telemetry for the information handling system 200. Some JSON events in an embodiment may represent adjustable system configuration that may correlate with hardware, software, or firmware failures in an embodiment. For example, a JSON event named "display_mode" having a value of high_definition may represent an adjustable system configuration placing the display into a high definition mode. In an embodiment, the hardware processor 202 executing machine readable code instructions for the data collector 293 may operate to analyze the contents of the JSON event comprising a failure, error, and failure operational telemetry, and to classify the type of JSON event.

Classification types may be preset according to instructions received by the hardware processor 202 executing machine readable code instructions for the automatic predictive capability recommendation system 290 and may assist the hardware processor 202 executing machine readable code instructions for the systems internal health assessor 295 in determining a probability that a given adjustable system configuration described by a JSON event comprising failure operational telemetry will co-occur in future JSON events with a given hardware, software, or firmware failure indicator, as described in greater detail below. In example embodiments, classification types, such as software resource use, hardware configuration, or driver performance, may be preset and available for use in classifying JSON events received from the data collector 293.

Incident classifications in an embodiment may be associated with one or more previously identified event values. For example, an incident classification for "workload," identifying relatively high workloads that may result in various hardware component failures in an embodiment may be associated by the hardware processor 202 executing machine readable code instructions for the automatic predictive capability recommendation system 290 with JSON events titled "CPU_workload_code_compiling_software_app" having a value exceeding a designated threshold level, for example 85%. In another example, an incident classification for "app_usage," identifying relatively intensive usage of an AI productivity tool enableable software application 211 that may result in various hardware component failures in an embodiment may be associated with JSON events titled "App_usage" having a value exceeding a designated threshold level, for example 85%. In still another example, an incident classification for "driver_performance," identifying poor or inefficient driver performance (e.g., as indicated by a percentage of calls to that driver resulting in an error over a preset time period) that may result in various hardware component failures in an embodiment may be associated with JSON events titled "driver_perf" having a value exceeding a designated threshold level, for example 50%. In yet another example, an incident classification for "background_usage," identifying relatively intensive usage of AI productivity tool enableable software applications 211 operating in idle mode or in the background that may result in various hardware component failures in an embodiment may be associated with JSON events titled "background_usage" having a value exceeding a threshold designated level, for example 85%. Any numerical or percentage maximum application usage threshold values preset as described directly above may be set to any number between one and one hundred in various embodiments described herein.

In an example embodiment, the hardware processor 202 executing machine readable code instructions for the data collector 293 in an embodiment may analyze the JSON event comprising failure operational telemetry described above to identify whether any of the JSON events and values associated with preset incident classifiers appear within the JSON event. For example, the hardware processor 202 executing machine readable code instructions for the data collector 293 in an embodiment may determine the JSON event comprising failure operational telemetry described above includes the JSON event named "CPU_workload," having a value of 0.90, or 90%, which is greater than the preset maximum CPU workload of 85%. The data collector 293 in such an embodiment may further identify the JSON event named "Temp," having a value of 150_F. The hardware processor 202 executing machine readable code instructions for the data collector 203 in an embodiment may apply such a classification by editing the JSON event comprising failure operational telemetry received from the data collector 293 to include the identified incident classification within the JSON event. All JSON events generated in such a way, which may include software, firmware, or hardware failures or malfunctions, may be transmitted from the data collector 293 to the telemetry data store 294 for storage. The hardware processor 202 executing machine readable code instructions for the automatic predictive capability recommendation system 290 operating at the information handling system 200 in an embodiment may be in communication with telemetry data store 294. Each classified JSON event comprising failure operational telemetry thus received in an embodiment may be stored in telemetry data store 294 for later analysis by the hardware processor 202 executing machine readable code instructions for the Systems Internal Health Assessor (SIHA) 295 or the automatic predictive capability recommendation system 290 in embodiments of the present disclosure.

The hardware processor 202 executing machine readable code instructions for the systems internal health assessor (SIHA) 295 in an embodiment may identify the classified JSON event comprising failure operational telemetry described above as indicating failure of an AI productivity tool enableable software application 211 or other software application, or a hardware component (e.g., 202, 203, 230) of a given hardware type, or substantial functional inefficiency or malfunction of the same. For example, the hardware processor 202 executing machine readable code instructions for the SIHA 295 in an embodiment may search the classified JSON event comprising failure operational telemetry described above, which has been stored in telemetry data store 294 to identify the JSON event named "WHEA_Error," having a value CPU for the hardware processor 202, indicating an error, such as a substantial inefficiency in the function at the CPU or hardware processor 202. Upon identification of such an error associated with an identified hardware component, the hardware processor 202 executing machine readable code instructions for the SIHA 295 may transmit a notification to the automatic predictive capability recommendation system 290 that the classified JSON event comprising failure operational telemetry indicates poor health of a hardware component. In other embodiments, the hardware processor 202 executing machine readable code instructions for the SIHA 295 may identify JSON events named "WHEA_Error," having values identifying any of the hardware components (e.g., 202, 203, 230) or AI productivity tool enableable software applications 211 included within the information handling system 200. The hardware processor 202 executing machine readable code instructions for the SIHA 295 in such embodiments may accordingly notify the automatic predictive capability recommendation system 290 of the classified JSON event comprising failure operational telemetry including such errors and indicating poor health of the identified hardware component or AI productivity tool enableable software application 211.

In another aspect, the telemetry data store 294 may also include results of benchmark testing performed at the enterprise management system (e.g., 198 of FIG. 1) for each of a plurality of information handling systems, including 200, in an embodiment. As described herein, the hardware processor 202 executing machine readable code instructions for the platform level analytics module 281 may test the performance of one or more hardware components (e.g., 202, 203, 230) by executing sample tasks similar to tasks performed by those devices routinely. The hardware processor 202 executing machine readable code instructions for the platform level analytics module 281 may assign a test benchmark score for each tested hardware component (e.g., 202, 203, 230), based on the speed and accuracy with which each component completes these basic tasks.

The hardware processor 202 executing machine readable code instructions for the systems internal health assessor (SIHA) 295 in an embodiment may search telemetry data store 294 data to identify indications within received application analytics, power analytics, or event viewer logs, or sequences of the same, translated into JSON events of hardware, software, or firmware failures, errors, or underperformance at the information handling system 200. In other embodiments, the hardware processor 202 executing machine readable code instructions for the SIHA 295 may determine that a component is failing if one or more JSON events comprising failure operational telemetry for the information handling system 200 using that hardware component (e.g., 202, 203, 230) include a number of errors for that component (e.g., 202, 203, 230) that meets or exceeds a maximum error threshold (e.g., 100, 50, 10, 5) within a preset period of time (e.g., 24 hours). These are only example maximum error threshold values and preset time period values, and any values for these thresholds are contemplated herein.

As another example, the hardware processor 202 executing machine readable code instructions for the SIHA 295 may determine that a component is failing if one or more JSON events, or sequences of JSON events comprising failure operational telemetry, for the information handling system 200 indicate a test benchmark score for that component (e.g., 202, 203, 230) that falls below a preset minimum benchmark threshold value (e.g., 85% of average crowd-sourced benchmark value). As described above, the telemetry data store 294 may store results of benchmark testing of the performance of one or more hardware components (e.g., 202, 203, 230) by executing sample tasks similar to tasks performed by those devices routinely. For each hardware component type (e.g., CPU 202, GPU, memory 203, network interface device 230, etc.), the hardware processor 202 executing machine readable code instructions for the SIHA 295 in an embodiment may determine the average test benchmark value across a plurality of information handling systems, including 200, against which test benchmark values for individual components (e.g., 202, 203, 230) may be compared in order to determine whether such an individual component is underperforming or failing. For example, the hardware processor 202 executing machine readable code instructions for the SIHA 295 may determine that the memory 203 of the information handling system 200 is failing in an embodiment in which the test benchmark score for that memory 203, as indicated within JSON events stored in telemetry data store 294 is less than a preset minimum percentage of the average test benchmark score (e.g., 85%) for all similar memory devices (e.g., computer hard drives) in the plurality of other information handling systems (e.g., including 200) reporting to the enterprise management system (e.g., 198 of FIG. 1) platform. This preset minimum percentage is just an example, and other values are contemplated. Further, preset minimum percentage may be defined on a component by component basis. In other words, the preset minimum percentage for determining whether a memory is failing may be 85%, while the preset minimum percentage for determining whether a hardware processor is failing may be 90%, for example.

The hardware processor 202 executing machine readable code instructions for the automatic predictive capability recommendation system 290 in an embodiment may gather JSON events comprising failure operational telemetry for the information handling system 200 which the SIHA 295 has identified as indicating a specific type of hardware, software, or firmware failure. As described herein, the hardware processor 202 executing machine readable code instructions for the automatic predictive capability recommendation system 290 in an embodiment may identify patterns in hardware, software, or firmware failure, such as sequences of errors, underperformance of hardware or software, resource consumption levels, criticality of failures, or other failure indicating telemetries, within such failure operational telemetry that may be used to avoid such failures in the future. In order to do so, the hardware processor 202 executing machine readable code instructions for the automatic predictive capability recommendation system 290 in an embodiment may analyze power and software application analytics, and event viewer logs within such failure operational telemetry, to identify one or more system configurations routinely co-occurring with, and potentially causing such failures. For example, patterns of sequences of errors, underperformance of hardware or software, resource consumption levels, or other failure indicating telemetries may be classified by a classification supervised learning algorithm according to embodiments herein as one or more system configurations routinely co-occurring with, and potentially causing, such failures within such failure operational telemetry. These power and software application analytics and event viewer logs within such failure operational telemetry for client information handling systems experiencing hardware, software, or firmware failures (e.g., as identified by the SIHA 295) may be stored in telemetry in the form of JSON events.

The hardware processor 202 executing machine readable code instructions for the automatic predictive capability recommendation system 290 in an embodiment may perform a classification supervised learning algorithm upon the failure operational telemetries identified by the SIHA 295 as indicating hardware, software, or firmware failures to identify a probability that an adjustable system configuration represented by a custom flag or a device current state within a JSON event will co-occur in the future with the specific type of hardware, software, or firmware failure identified by the SIHA 295. A recurrent neural network classifier or other classification algorithm executes a software process of recognizing, understanding, and grouping JSON events within JSON events comprising failure operational telemetries into sub-populations. The hardware processor 202 executing machine readable code instructions for the automatic predictive capability recommendation system 290 in an embodiment may train a machine-learning classifier executing a classification supervised learning algorithm based on the JSON events comprising failure operational telemetries known to describe hardware, software, or firmware failures in order to identify other JSON events (e.g., describing hardware, software, or firmware, usage or configurations, otherwise referred to herein as adjustable system configurations) that may routinely co-occur with JSON events identifying the known hardware, software, or firmware failures. For example, the hardware processor 202 executing machine readable code instructions for the automatic predictive capability recommendation system 290 in an embodiment may train a machine-learning classifier to determine a probability that any given JSON event within the JSON events comprising failure operational telemetries identified by the SIHA 295, or any sequence of given JSON events within the JSON events identified by the SIHA 295, as indicating hardware, software, or firmware failure will co-occur in the future with the same type of hardware, software, or firmware failure.

The hardware processor 202 executing machine readable code instructions for the automatic predictive capability recommendation system 290 in an embodiment may perform this assignment of probabilities throughout many iterations performed across several JSON events identified by the hardware processor 202 executing machine readable code instructions for the SIHA 295 as identifying a hardware, software, or firmware failure during a training process. Many types of classification algorithms may be used in various embodiments, including logistic regression, naïve Bayes, K-nearest neighbors, decision trees, support vector machines, or gradient descent method. These classification algorithms may be trained to become classification supervised learning algorithms by adjusting probabilities assigned in each previous iteration based on the error in prediction produced in each later iteration, until the algorithm is capable of producing probabilities with an error rate below a preset error rate threshold (e.g., 1%, 2%, 5%, etc.) predicting co-occurrence of a given JSON event with a future hardware, software, or firmware failure similar to that given in the JSON events comprising failure operational telemetries upon which the classifier was trained. In such a way, the hardware processor 202 executing machine readable code instructions for the automatic predictive capability recommendation system 290 in an embodiment may predict the likelihood that a similar hardware, software, or firmware failure will occur in the future, where the same combination of adjustable system configurations are employed.

The hardware processor 202 executing machine readable code instructions for the automatic predictive capability recommendation system 290 in an embodiment may identify one or more recommended intervention actions of the information handling system 200 for avoiding recurrence of the error, which may include a recommendation to adjust an adjustable problematic system configuration. In an embodiment, the hardware processor 202 executing machine readable code instructions for the automatic predictive capability recommendation system 290 may feed the telemetry identified by the hardware processor 202 executing machine readable code instructions for the SIHA 295 as containing an error indicating hardware, firmware, or software failure or malfunction into a trained neural network to determine such a recommended intervention action of the information handling system 200 for avoiding recurrence of the error. Such a trained neural network may be trained at the enterprise management system (e.g., 198 of FIG. 1) based on telemetries received from a plurality of information handling systems, including 200, over time. The input layer for such a neural network may include all telemetry data included within such received JSON events from the plurality of information handling systems, including 200, indicating configurations, policies, power consumption, usage statistics, and error warnings. The output layer of the neural network may provide one or more recommended intervention actions of the information handling system 200 for avoiding recurrence of the error identified within the input JSON event.

Example recommended intervention actions for the information handling system 200 in an embodiment may include any actions supported or executable by the AI productivity tool enablable software application 211, or the AI productivity tool platform tool 280, or by the user via communication with the information handling system 200 using the universal user conversational interface software application 270. More specifically, user executable recommended interventions may include, for example, physical replacement of a hardware component (e.g., 202, 203, 230), or maintenance, repair, adjustment of settings, limitations on operation, or cleaning of such hardware component, which may include a fan in some embodiments. As another example, recommended intervention actions for the information handling system 200 may also include actions executable via the AI productivity tool enableable software application 211, such as performing a backup or increasing the frequency of backups of all stored data in memory 203 to a cloud-based location for remote access to a clone of the current OS for the information handling system 200. As yet another example, recommended intervention actions for the information handling system 200 may also include actions executable via the AI productivity tool enableable software application 211, such as automatically generating a purchase order for a replacement hardware component having the same model number as the failed or malfunctioning hardware component identified by the SIHA 295. In yet another example, recommended intervention actions for the information handling system 200 may also include recommendation intervention actions executable via the AI productivity tool enableable software application 211 for providing a responsive set of instructions for replacing the drive memory such as a hard disk drive (HDD) (e.g., 120 in FIG. 1) or a solid state disk drive (e.g., 105 in FIG. 1) in the information handling system In still another example, recommended intervention actions for the information handling system 200 may also include recommendation intervention actions executable via the AI productivity tool enableable software application 211, such as setting a flag to automatically boot into basic input output system (BIOS) mode upon restarting of the information handling system 200, to facilitate BIOS level network connection to the cloned OS for the information handling system 200 in order to ensure that failure of the hardware component does not impact productivity of the user.

In other cases, the recommended intervention actions for the information handling system 200 may also include actions executable via the AI productivity tool enableable platform tool 280, such as determining whether the network interface device 230 can be accessed in BIOS mode to establish a network connection to the cloned OS for the information handling system 200. The recommended intervention actions for the information handling system 200 may also include actions executable via the AI productivity tool enableable platform tool 280 in an embodiment, such as retrieving network access credentials 283 for storage at an embedded controller random access memory (RAM) accessible by the AI productivity tool enableable platform tool 280 that may be used to provision the network interface device 230 for network connection to the cloned OS for the information handling system 200 while the information handling system 200 operated in BIOS mode, at the platform level, below the OS.

In some cases, the hardware processor executing machine readable code instructions for the automatic predictive capability recommendation system 290 may identify more than one recommended intervention action for avoiding recurrence of an error indicating failure or malfunction of hardware, firmware, or software. This may be the case, for example, when the trained neural network of the automatic predictive capability recommendation system 290 generates an output layer having more than one recommended intervention action. In such a case, each of these outputs may be accompanied by a weighting value indicating the strength of prediction that any given output recommended intervention action may successfully avoid recurrence of such an error. In such an embodiment, the hardware processor executing machine readable code instructions for the automatic predictive capability recommendation system 290 may identify output recommended intervention actions having a weighting value above a preset minimum threshold, such as, for example, 80%. Any percentage value between zero and 100% may be used, and this is only one example. Further, the hardware processor executing machine readable code instructions for the automatic predictive capability recommendation system 290 may rank or prioritize these plural output recommended intervention actions based on their associated weightings. For example, an output recommended intervention action having a highest weighting (e.g., closest to 100%) may be prioritized as first in line for execution, followed by each consecutively lower weighting value for each of the other recommended intervention actions.

Upon execution of such a recommendation at one or more of the plurality of information handling systems, including 200, the results of such an execution (e.g., satisfactory or unsatisfactory resolution or avoidance of recurrence of the detected error) may be used to retune weight matrices of the multi-layered neural network to more accurately predict in the future other recommended intervention actions. For example, successful resolution or avoidance of recurrence of a detected error through execution of a recommended intervention action may increase weighting for one or more nodes in weight matrices of the neural network to strengthen a likelihood that the same intervention action may be recommended in the future where the same error is detected. As another example, unsuccessful resolution or avoidance of recurrence of a detected error through execution of a recommended intervention action may decrease weighting for one or more nodes in weight matrices of the neural network to lessen a likelihood that the same intervention action may be recommended in the future where the same error is detected.

Further, if a user of one of the information handling systems, including 200, whose telemetry data is used to train the neural network refuses to execute the recommended intervention actions, this user refusal may be used to retune weight matrices of the multi-layered neural network. For example, user acceptance of execution of a recommended intervention action may increase weighting for one or more nodes in weight matrices of the neural network to strengthen a likelihood that the same intervention action may be recommended in the future where the same error is detected. As another example, user rejection of execution of a recommended intervention action may decrease weighting for one or more nodes in weight matrices of the neural network to lessen a likelihood that the same intervention action may be recommended in the future where the same error is detected.

In some embodiments, the hardware processor 202 executing machine readable code instructions for the automatic predictive capability recommendation system 290 in an embodiment may identify an adjustable system configuration represented by a custom flag or a device current state within a JSON event comprising failure operational telemetries that, alone or as part of a sequence of JSON events, is associated with a probability of future co-occurrence with the specific type of hardware, software, or firmware failure that meets a preset failure probability threshold as an adjustable problematic system configuration. As described directly above, the hardware processor 202 executing machine readable code instructions for the automatic predictive capability recommendation system 290 executing a classification supervised learning algorithm in an embodiment may produce a probability that any given JSON event identifying an adjustable system configuration or combination of such JSON events will co-occur in the future with another JSON event in a sequence indicating hardware, software, or firmware failure. For example, the hardware processor 202 executing machine readable code instructions for the automatic predictive capability recommendation system 290 may identify a JSON event or a combination of JSON events associated with a probability for co-occurrence with a future hardware, software, or firmware failure that meets or exceeds a preset failure probability threshold value (e.g., 90%, 95%, 98%, 99%). Any JSON event identified in such a way by the hardware processor 202 executing machine readable code instructions for the automatic predictive capability recommendation system 290 in an embodiment may be labeled as a problematic adjustable system configuration.

Following such an identification of problematic adjustable system configurations in an embodiment, the hardware processor 202 executing machine readable code instructions for the automatic predictive capability recommendation system 290 may routinely monitor future performance of the information handling system 200 to identify such problematic adjustable system configurations before a similar hardware, firmware, or AI productivity tool enableable software application 211 failure occurs, in order to prevent such an occurrence.

As described herein, when an occurrence of one or more problematic adjustable system configurations (e.g., combinations of usage and configurations) are detected in current telemetry, the hardware processor 202 executing machine readable code instructions for the automatic predictive capability recommendation system 290 may recommend adjustments to such adjustable system configurations (e.g., hardware, software, or firmware usage or configuration) to avoid the potential hardware, firmware, or software failure previously caused by such a combination, prior to its occurrence. Various hardware, firmware, or AI productivity tool enableable software application 211 policy settings in an embodiment may be determined to be an adjustable problematic system configuration in an embodiment, due to high demands on various hardware components. Execution of background software applications, including AI productivity tool enableable software application 211 in an embodiment may also be determined to be an adjustable problematic system configuration in an embodiment. These background software application executions may be identified with reference to the JSON event described above, and stored in telemetry data store 294. Methods for AI productivity tool enableable software application 211 and firmware updates in an embodiment may also be determined to be an adjustable problematic system configuration in an embodiment. Execution of specific AI productivity tool enableable software applications 211 or specific versions thereof or of firmware drivers in an embodiment may also be determined to be an adjustable problematic system configuration in an embodiment. Consumption of power for a specific hardware component (e.g., 202, 203, 230) may also be determined to be an adjustable problematic system configuration in an embodiment.

The hardware processor 202 executing machine readable code instructions for the automatic predictive capability recommendation system 290 in an embodiment may recommend execution of one or more recommended intervention actions, which may include adjustment of the adjustable problematic system configuration when one is identified within current telemetry. For example, the hardware processor 202 executing machine readable code instructions for the automatic predictive capability recommendation system 290 in an embodiment may recommend physical replacement of a hardware component (e.g., 202, 203, 230), or maintenance, repair, configuration or setting adjustment, or cleaning of such hardware component, which may include a fan in some embodiments. As another example, the hardware processor 202 executing machine readable code instructions for the automatic predictive capability recommendation system 290 in an embodiment may recommend performing a backup or increasing the frequency of backups of all stored data in memory 203 to a cloud-based location for remote access to a clone of the current OS for the information handling system 200, via the AI productivity tool enableable software application 211, for example if a memory storage device (105 or 120 of FIG. 1) or memory 203 is indicating error status. As yet another example, the hardware processor 202 executing machine readable code instructions for the automatic predictive capability recommendation system 290 in an embodiment may recommend automatically generating a purchase order for a replacement hardware component having the same model number as the failed or malfunctioning hardware component identified by the SIHA 295, via the AI productivity tool enableable software application 211. In yet another example, recommended intervention actions for the information handling system 200 may also include recommendation intervention actions executable via the AI productivity tool enableable software application 211 for providing a responsive set of instructions or transmitting a video instruction for replacing the drive memory such as a hard disk drive (HDD) (e.g., 120 in FIG. 1) or a solid state disk drive (e.g., 105 in FIG. 1) in the information handling system. In still another example, the hardware processor 202 executing machine readable code instructions for the automatic predictive capability recommendation system 290 in an embodiment may recommend setting a flag to automatically boot into basic input output system (BIOS) mode upon restarting of the information handling system 200, to facilitate BIOS level network connection to the cloned OS for the information handling system 200 in order to ensure that failure of the hardware component does not impact productivity of the user, via the AI productivity tool enableable software application 211.

In other cases, the hardware processor 202 executing machine readable code instructions for the automatic predictive capability recommendation system 290 in an embodiment may identify one or more recommended intervention actions for determining, via the AI productivity tool enableable platform tool 280, whether the network interface device 230 can be accessed in BIOS mode to establish a network connection to the cloned OS for the information handling system 200. The hardware processor 202 executing machine readable code instructions for the automatic predictive capability recommendation system 290 in an embodiment may one or more recommended intervention actions for retrieving, via the AI productivity tool enableable platform tool 280, network access credentials 283 for storage at an embedded controller random access memory (RAM) accessible by the AI productivity tool enableable platform tool 280 that may be used to provision the network interface device 230 for network connection to the cloned OS for the information handling system 200 while the information handling system 200 operated in BIOS mode, at the platform level, below the OS.

As described herein, the one or more recommended intervention actions in some embodiments may include adjustment of the adjustable problematic system configuration when one is identified within current telemetry. In such a case, the hardware processor 202 executing machine readable code instructions for the automatic predictive capability recommendation system 290 in an embodiment identify one or more recommended intervention actions for adjustment of the adjustable problematic system configuration when one or more is identified within current telemetry. For example, in an embodiment in which the hardware processor 202 executing machine readable code instructions for the automatic predictive capability recommendation system 290 identified a hardware policy setting as a problematic adjustable system configuration, the hardware processor 202 executing machine readable code instructions for the automatic predictive capability recommendation system 290 may identify one or more recommended intervention actions for adjustment to the hardware policy settings to avoid potential future failure of one or more hardware components (e.g., 202, 203, 230) or AI productivity tool enableable software application 211. As another example, in an embodiment in which the automatic predictive capability recommendation system 290 identified a background usage of the AI productivity tool enableable software application 211 as a problematic adjustable system configuration, the hardware processor 202 executing machine readable code instructions for the automatic predictive capability recommendation system 290 may identify one or more recommended intervention actions for adjustment to the background usage of the AI productivity tool enableable software application 211 to avoid potential future failure of one or more hardware components (e.g., 202, 203, 230), or AI productivity tool enableable software application 211.

In yet another example, in an embodiment in which the automatic predictive capability recommendation system 290 identified a software or firmware update method as a problematic adjustable system configuration, the hardware processor 202 executing machine readable code instructions for the automatic predictive capability recommendation system 290 may identify one or more recommended intervention actions for adjustment to the software or firmware update methods to avoid potential future failure of one or more hardware components (e.g., 202, 203, 230), or the AI productivity tool enableable software application 211. In still another example, in an embodiment in which the automatic predictive capability recommendation system 290 identified execution of the AI productivity tool enableable software application 211 or execution of a specific version of thereof or of firmware as a problematic adjustable system configuration, the hardware processor 202 executing machine readable code instructions for the automatic predictive capability recommendation system 290 may identify one or more recommended intervention actions for installation of updated drivers or AI productivity tool enableable software applications 211, or termination of certain AI productivity tool enableable software applications 211 to avoid potential future failure of one or more hardware components or of the AI productivity tool enableable software application 211. In an embodiment in which one or more AI productivity tool enableable software applications 211 are using hardware resources at a maximum usage value (e.g., 85%), the hardware processor 202 executing machine readable code instructions for the automatic predictive capability recommendation system 290 may identify one or more recommended intervention actions for decreasing the usage of those hardware component resources for those specific AI productivity tool enableable software applications 211 by ten percent. In such a way, the hardware processor 202 executing machine readable code instructions for the automatic predictive capability recommendation system 290 may identify one or more recommended intervention actions for adjustments to such hardware (e.g., 202, 203, or 230), AI productivity tool enableable software applications 211, or firmware usage or configuration to avoid the potential hardware, firmware, or software failure previously caused by such a combination, prior to its occurrence.

Upon identification of one or more recommended intervention actions of the information handling system 200 for avoiding recurrence of the error indicating hardware, software, or firmware failure or malfunction, the automatic predictive capability recommendation system 290 may work in tandem with the text generation module 297, the recommendation intent to capability determination module 252 of the OTB AI productivity tool 250, and the universal software application conversational interface 270 to notify a user of the problematic adjustable system configuration or the one or more recommended intervention actions via a text or audio prompt. Further, the user may be prompted for approval to execute the one or more recommended intervention actions identified in embodiments via the text generation module 297. Then, a user-approved capability or function of the AI productivity tool enableable software application 211 or the AI productivity tool enableable platform tool 280 may perform the recommended intervention action or actions.

The first step in this process may include the hardware processor 202 executing machine readable code instructions of the text generation module 297 to generate a natural language text description for each of the one or more recommended intervention actions of the information handling system for avoiding recurrence of the error determined by the automatic predictive capability recommendation system 290. As described in greater detail below with respect to FIG. 3, the recommendation intent to capability determination module 252 may generate a vectorized recommendation intent value for each of these natural language descriptions, and compare these vectorized recommendation intent values against a plurality of capability intent values stored in the capability intent values database 256 for capabilities of the AI productivity tool enableable software application 211 and the AI productivity tool platform tool 280. Such a comparison may yield a best match responsive capability for each of the natural language descriptions of the recommended intervention actions of the information handling system for avoiding recurrence of the error, if available. In such a way, the automatic predictive capability recommendation system 290 may identify code instructions for the AI productivity tool enableable software application 211 or for the AI productivity tool enableable platform tool 280 that may be automatically executed, with prompted user approval by the OTB AI productivity tool 250, to perform the recommended intervention action for avoiding recurrence of the error indicating failure or malfunction of hardware, firmware, or software identified above. In an embodiment, the prompted user approval by the OTB AI productivity tool 250 may approve or select some but not all recommended intervention actions, and thus only execution of user approved recommended intervention actions for avoiding recurrence of the error indicating failure or malfunction of hardware, firmware, or software may occur.

The text generation module 297 in an embodiment may include machine readable code instructions for various language learning models (LLMs) in embodiments herein. Such an LLM in an embodiment may translate a portion of JSON event, such as an error code, error classification, warning flag, or any combination thereof, as well as a recommended intervention action for avoiding recurrence of such an error, as identified by the automatic predictive capability recommendation system 290 into human-understandable and conversation text, phrases, or sentences. LLMs such as large language model meta-AI (Llama)®, Phi-3 small language model (SLM)® may be used in specific embodiments. In other embodiments, other existing or later-developed LLMs may be used, such as a generative pre-training transformer (GPT)®, Pathways Language Model (PaLM)®, Bard®, or Jasper®. The hardware processor 202 executing machine readable code instructions of the text generation module 297 may then transmit the human-understandable and conversation text, phrases, or sentences recommended execution of the recommended intervention action for avoidance of recurrence of the error to the automatic predictive capability recommendation system 290.

The hardware processor 202 executing machine readable code instructions of the automatic predictive capability recommendation system 290 may then transmit the human-understandable and conversation text, phrases, or sentences describing in natural language the recommended intervention action for avoidance of the recurrence of the error to the recommendation intent to capability determination module 252. Execution of computer readable code instructions of the recommendation intent to capability determination module 252 and the OTB AI productivity tool 250 identifies a best match responsive capability for each of the identified recommended intervention actions, as described in greater detail below with respect to FIG. 3. The hardware processor 202 executing machine readable code instructions of the automatic predictive capability recommendation system 290 may then transmit the human-understandable and conversation text, phrases, or sentences describing in natural language the recommended intervention action and description of the error condition or problematic configuration to the universal user conversational interface software application 270 for display or recitation to the user via the OTB AI productivity tool 250. This prompting of the user with the universal user conversational interface software application 270 may further prompt for approval to execute one or more capabilities to perform the recommended intervention actions in embodiments herein. Upon user approval of the recommended intervention action via the universal user conversational interface software application 270, the hardware processor 202 may execute machine readable code instructions of the automatic predictive capability recommendation system 290 to execute the best match capabilities for each of the recommended interventions actions to avoid recurrence of the error, via the OTB AI productivity tool 250, the AI productivity tool enableable software application 211 and the AI productivity tool enableable platform tool 280.

FIG. 3 is a block diagram illustrating computer readable code instructions of an on the box (OTB) artificial intelligence (AI) productivity tool executed by a hardware processor of an information handling system to instruct an AI productivity tool enableable software application or AI productivity tool enableable platform tool to perform a capability having a vectorized capability intent value correlating to a vectorized intervention recommendation input intent value according to an embodiment of the present disclosure. The AI productivity tool enableable software application 311 or the AI productivity tool platform tool 380 in an embodiment may then execute a responsive best match capability for operations, software services, or generating a response to meet the recommended intervention action, generated by the automatic predictive capability recommendation system 390, as described above in embodiments of the present disclosure, to avoid recurrence of a detected error indicating failure or malfunction of hardware, firmware, or software.

The OTB AI productivity tool 350 in an embodiment may receive, via the automatic predictive capability recommendation system 390, one or more recommended intervention actions to avoid recurrence of the detected hardware, software or firmware error, described herein as an intervention recommendation input in natural language. Those intervention recommendation inputs request actions or services of various software applications executing at the operating system (OS) level, or platform tools executing at the platform level below the operating system (OS) in embodiments herein. A hardware processor 302 executing code instructions of the OTB AI productivity tool 350 in an embodiment may match these received intervention recommendation inputs to known capabilities of one or more of the AI productivity tool-enableable software applications 311 or the AI productivity tool enableable platform tool 380 through execution by the hardware processor 302 of machine readable code instructions for one or more natural language processing machine learning models.

AI productivity tool enableable software application 311 or AI productivity tool-enableable platform tool 380 may have or publish a list of recognized capabilities or functionalities that it may perform during execution of such an AI productivity tool enableable software application 311 or AI productivity tool enableable platform tool 380, respectively, in response to an intervention recommendation input in embodiments herein. The received intervention recommendation inputs is received and processed by the OTB AI productivity tool 350 with a recommendation intent determination module 351 and text embedding machine learning module 365 and embedded into a recommendation intent vector value. The available capabilities are provided with text descriptors that may also be processed into vectorized capability intent values in a multi-axis vector space such that these intent value mathematical representations of a received intervention recommendation inputs and of a capability may be correlated by a similarity matching algorithm to select a capability responsive to an input recommendation from the automatic predictive capability recommendation system 390.

This process includes gathering, either in real-time or prior to execution of the OTB AI productivity tool 350, via the capabilities gathering module 353, capabilities associated with each of a plurality of AI productivity tool-enablable software applications 311 or the AI productivity tool enableable platform tool 380. These capabilities (also called capability intents and having capability intent values) may describe those functionalities of each of the AI productivity tool-enablable software applications 311 or the AI productivity tool enableable platform tool 380 that may be defined by an ITDM of an enterprise or a manufacturer and used when interfacing with the OTB AI productivity tool 350. These natural language descriptions of the capabilities for the AI productivity tool-enableable software applications 311 or the AI productivity tool enableable platform tool 380 may be stored within a natural language capability database 355 for comparison to received intervention recommendation inputs, for example, in order to identify a responsive capability most likely to address the intervention recommendation within the received intervention recommendation inputs and any additional user's request.

The hardware processor 302 executing machine readable code instructions of the OTB AI productivity tool 350 may determine capability intent values associated with natural language descriptions of the gathered capabilities for each of a plurality of AI productivity tool-enablable software applications 311. In an embodiment, these capability intent values are a mathematical representation of the natural language descriptions of capability operations or services from various AI productivity tool-enablable software applications 311 in an embodiment. These capability intent values may be represented by a mathematical value in a multi-axis vector space that may be associated with the natural language description for that capability or intent. In an embodiment, the capabilities may also be associated with an identification (ID) such as an alphanumeric ID that may be stored within a capability intent values database 356. Generating such capability intent values as vectors may be a first step in a natural language processing method to determine a capability corresponding to and responsive to the requested action within an intervention recommendation input that takes into account the context or semantics of the words used within the intervention recommendation input.

In an embodiment, the capability intent values database 356 may store a plurality of capabilities associated with each of a plurality of AI productivity tool-enablable software applications 311 or the AI productivity tool enableable platform tool 380 with a name, capability ID, natural language descriptor, or a capability intent value in some embodiments. These capabilities stored at the capability intent values database 356 may include any input and output capabilities provided by the AI productivity tool-enablable software applications 311 or the AI productivity tool enableable platform tool 380 being executed by the hardware processor 302 or any other hardware processing devices, such as embedded controller 304. For example, an AI productivity tool-enablable software application 311 may include a word processing application such as Microsoft® Word® that may receive input (e.g., via voice at a microphone 183 or text via a keyboard 190 of FIG. 1) and provide output via text. Still further, other examples of an AI productivity tool-enablable software application 311 may include an updating software, virus protection software, and setting optimization software such as Dell® SupportAssist® module executable by the hardware processor 302 or other hardware processing resource of the information handling system. With SupportAssist® a user may provide input via, for example, the microphone requesting information related to a setting associated with the information handling system. Thus, capabilities of SupportAssist® may include virus protection capabilities, setting manipulation capabilities, and software updating capabilities that may each be stored at the capability intent values database 356.

Even further, examples of an AI productivity tool-enablable software application 311 may include Dell® Display®/Peripheral Manager®. The Dell® Display®/Peripheral Manager® may have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® software may have capability intent values and a capability identifier stored at the capability intent values database 356 as described herein. It is appreciated that the AI productivity tool-enablable software application 311 may include, for example, Dell® Trusted Device® software, a remediation Dell® APEX Managed Device Service (AMDS)® software, Alienware Command Center (AWCC)® software, among others. Some AI productivity tool-enablable software applications 311 or the AI productivity tool enableable platform tool 380 may even be subagents operating locally on the box of the information handling system but have remote access to a larger software application executing at a cloud based server location for providing software services in some embodiments herein.

The capabilities may be registered with the OTB AI productivity tool 350 in an embodiment for establishing capability intent values for these capabilities such that intervention recommendation input intent values may be correlated with one or more capability intent values for registered capabilities, as described herein. For example, in an embodiment in which the AI productivity tool enableable software application 311 or the AI productivity tool enableable platform tool 380 is a software application for optimizing performance of hardware components at the information handling system, such capabilities may include adjusting settings or configurations for various hardware components. As another example, in an embodiment in which the AI productivity tool enableable software application 311 optimizes performance of other software applications, such capabilities may include automatically downloading and installing updates for such AI productivity tool enableable software applications 311, or pausing execution of background applications. In yet another example, in an embodiment in which the AI productivity tool enableable software application 311 is one of several software applications routinely executing on the information handling system, and optimized by such an OTB AI productivity tool 350, such capabilities may include automatically generating and transmitting e-mails or text messages, automatically scheduling meetings, or generating chatbot or other user interface responses.

Each of the capabilities stored at the capability intent values database 356 may have a description with text descriptors, may be associated with a unique ID, and may have a capability intent value in an embodiment. Upon registration of a given capability by the AI productivity tool enableable software application 311 or the AI productivity tool enableable platform tool 380 in an embodiment, a hardware processor 302 for the information handling system may execute machine readable code instructions for one or more text embedding algorithms to generate a multi-dimensional vector capability intent value for that capability that, for example, may be based on text descriptors for that capability. Each of these capability intent values for association with these capabilities may also be associated with an ID such as an alphanumeric ID that may identify, uniquely, these capabilities in the capability intent values database 356, for example. These capability intent values may later be used to determine which of the capabilities the automatic predictive capability recommendation system 390 intends to invoke or execute within a received intervention recommendation input based on similarity with a recommendation intent value, as described herein.

As described above, the capability intent values for natural language descriptions of capabilities for an AI productivity tool enableable software application 311 or the AI productivity tool enableable platform tool 380 are a vectorized mathematical representation in a multi-axis vector space of the natural language descriptions of capability operations or services from various AI productivity tool-enablable software applications 311 or the AI productivity tool enableable platform tool 380 in an embodiment, as generated using natural language processing (NLP) techniques via execution of machine readable code instructions by the hardware processor 302 of the recommendation intent determination module 351 and the text embedding module 365. Each axis of the multi-axis vector space may provide a measurement of various attributes of a text excerpt that are known to provide context or semantic understanding of the text. For example, one or more axis values may represent a semantic meaning aspect of a reader's understanding of a given text excerpt and may depend upon the reader's knowledge of any given word's meaning within the text, identified phrases within the text, or the understood order or sequence of words within the text. More specifically, one or more axis values may represent semantic aspects of the reader's understanding as enhanced with a larger vocabulary and assigned values for which words in that vocabulary are synonyms (closer in meaning) to a given word in that text, and which words are antonyms (further away in meaning) to that given word. As another example, one or more axis values may represent the reader's ability to identify common phrases, such as "in other words" may provide greater insight to the semantic meaning of a text excerpt using this phrase than an understanding of each of the words "in," "other," and "words" used separately from one another would. As yet another example, one or more axis values may represent the importance of the order of certain words in an excerpt may impact semantic meaning of the excerpt. More specifically, the phrase "man bites dog" may have a completely different semantic or contextual meaning than the phrase "dog bites man," although each phrase has the same words, just in a different order.

Each axis of the multi-axis vector space, and thus, each value within a vector within such a multi-axis vector space may provide a measurement of these various attributes within a given initial or updated capability intent value in embodiments herein. Hundreds of vector axes may be the basis for the intent vector value in a multi-dimensional "space." For example, a vector for an intervention recommendation input intent value or for capability intent value may provide a measurement of similarity between any given word within the intervention recommendation input or AI productivity tool enablable software application 311 capabilities, respectively, a measurement of dissimilarity with known antonyms, identification of any given word as part of a phrase, or usage of any given word in a specific order that is known to be of importance. In such a way, the vectorized intervention recommendation input intent value and capability intent values may mathematically represent a reader's contextual or semantic understanding of the intervention recommendation input and the natural language descriptors for the capabilities of the AI productivity tool enableable software applications 311. These vectors may then be compared to one another, via the hardware processor 302 executing machine readable code instructions of the semantic similarity search module 366 to determine statistical correlation, in order to understand how alike various phrases within the intervention recommendation input and capabilities are, and how alike the usage of those words and phrases are to provide a context, such as influenced by the order of those words or phrases and their relation to one another, as well as other semantic factors represented in the multi-axis vector space.

The hardware processor 302 may also execute machine readable code instructions of a text embedding module 365 to detect which of these words are nouns, verbs, or commonly used sentence structures and generate a vectorized intervention recommendation input intent value for the intervention recommendation input. These vectorized capability intent values and vectorized intervention recommendation input intent values may then be compared to one another, via the hardware processor 302 executing machine readable code instructions of the semantic similarity search module 366, in order to determine a statistical correlation that represents understanding how alike various phrases within the intervention recommendation input and capabilities are, and how alike the usage of those words and phrases are to provide a context, such as influenced by the order of those words or phrases and their relation to one another. For example, the hardware processor 302 executing machine readable code instructions of the semantic similarity search module 366, and in some embodiments in tandem with algorithms of the text embedding module 365 may compare the vectorized intervention recommendation input intent value with the capability intent values stored within the capability intent value database 354 to identify a capability intent value correlated to the intervention recommendation input intent value, indicating that the intervention recommendation input is requesting that the AI productivity tool enableable software application 311 or the AI productivity tool enableable platform tool 380 execute the capability associated with that capability intent value. Such a comparison, in an embodiment, may include, for example, determining a distance or a vector value difference between the vectorized intervention recommendation input intent value and the vectorized capability intent value or a correlation value between the two. Examples of semantic similarity search module 366 algorithms may include, for example, a Cosine Similarity search machine learning model, a vector space model (VSM) similarity search machine learning model, or a K-Means Text Clustering similarity search machine learning model. These are only a few examples of semantic similarity search algorithms that may be employed and it is contemplated that any known or later-developed semantic similarity search algorithm may also be employed.

Upon determination of a capability intent value for each of the gathered or registered AI productivity tool enableable software application 311 or the AI productivity tool enableable platform tool 380 capabilities, the OTB AI productivity tool 350 may begin processing received intervention recommendation inputs from the automatic predictive capability recommendation system 390 for identification of responsive capabilities for an application software service, response or other function corresponding to one of these capability intent values. In an example embodiment, the automatic predictive capability recommendation system 390 may provide an intervention recommendation input in the form of text to the recommendation intent determination module 351, as described in greater detail above with respect to FIG. 2. The recommendation intent determination module 351 in an embodiment may then initiate execution of machine readable code instructions for an intent recognition pipeline machine learning module 361. In an embodiment, the hardware processor 302 executing machine-readable code instructions for the intent recognition pipeline machine learning module 361 may further orchestrate any combination of a plurality of machine learning modules (e.g., 365, or 366) to process the intervention recommendation input, as well as any received user query inputs from a user, to determine the intended goal or recommendation intent within the received text of the intervention recommendation input.

During operation for example, the hardware processor 302 executing machine-readable code instructions of the recommendation intent determination module 351 may load one or more machine learning models such that, for example, the text of an intervention recommendation input and any text or voice input from the user, such as in response to a prompt for approval, may be processed through any of a plurality of natural language models (e.g., 365 or 366) or other ML models in order to determine an recommendation intent value of the intervention recommendation input. For example, a text embedding module 365 or a semantic similarity search module 366 work in various combinations with one another to detect an intent, represented by generating a recommendation intent vector value from the text of the intervention recommendation input received from the automatic predictive capability recommendation system 390 and similarity match the same with capability intent values for responsive capabilities to avoid occurrence of an error or failure.

The hardware processor 302 executing machine-readable code instructions of an intent recognition pipeline machine learning module 361 may orchestrate the interplay between each of the text embedding module 365, and semantic similarity search module 366 to establish a recommendation intent vector value in a multi-axis vector space defined with these machine learning models and correlate that recommendation intent value with a corresponding capability intent value in an embodiment. Several text embedding algorithms may be used in various embodiments herein in order to provide a vectorized mathematical representation of semantic understanding for an intervention recommendation input or for a capability described in natural language. For example, the text embedding module 365 may employ a Latent Semantic Analysis (LSA) or Latent Dirichlet allocation (LDA) which may define how close each of the observed terms in the received intervention recommendation input are to various synonyms. As another example, the text embedding module 365 may employ a Word2Vec algorithm, which includes a neural network trained to understand which terms or phrases should be considered closer or further away from certain synonyms or antonyms. As yet another example, the text embedding module 365 may employ a fully recurrent neural network trained to analyze the order of terms within the received intervention recommendation input or the natural language descriptors of the capabilities for the AI productivity tool enableable software applications 311 or the AI productivity tool enableable platform tool 380.

The hardware processor 302 executing machine-readable code instructions of the intent recognition pipeline machine learning module 361 in an embodiment may apply the text embedding module 365 to generate a recommendation intent value as described and then input that recommendation intent value from the text embedding module 365 to the recommendation intent to capability determination module 352 for execution of the semantic similarity search module 366. The recommendation intent to capability module 352 may utilize the semantic similarity search module 366 for a similarity correlation between the recommendation intent value and a stored capability intent value to determine a capability that may perform the intervention recommendation.

For example, in embodiments herein, a hardware processor 302 may execute machine readable code instructions for a semantic similarity search module 366, via a recommendation intent to capability module 352, that compares the vectorized intervention recommendation input intent value and the capability intent values stored within the capability intent values database 356. Such a comparison may be performed using a semantic search machine learning model, such as a cosine similarity or other semantic similarity search algorithm that compares the distance or value difference in a multi-axis vector space between two vectors to determine the contextual similarity between the natural language description of the embedded text algorithm generated capabilities having the capability intent values and the natural language intervention recommendation input having an intervention recommendation input intent value generated from an embedded text algorithm. Such a contextual or semantic search methodology may take into account the fact that the same word may have two meanings or consider synonyms of words, for example based on generated intent values of multiple words or recognized phrases or parts of speech that yield the vector intent value from the text embedding algorithm machine learning models used to generate capability and recommendation intent vector values. The cosine similarity search comparison or other semantic similarity search algorithm may be performed for several of the capability intent values stored within the capability intent value database 356 to identify one or more best match responsive capability intent values that most closely match the intervention recommendation input value, according to embodiments herein.

For example, a hardware processor 302 executing machine readable code instructions for a semantic similarity search module 366 may determine a distance, that is a value difference of the vector intent values within the multi-axis vector space between the intervention recommendation input intent value and each of a plurality of capability intent values. Then, for each of those determined distances, the hardware processor executing machine readable code instructions for a semantic similarity search module 366 may determine an angular similarity having a value between zero and one for the intervention recommendation input intent value and each of a plurality of capability intent values. This angular similarity value in an embodiment may comprise the semantic similarity search score for a given capability intent value, where zero is a worst match and one is a best match between the given capability intent value and the intervention recommendation input intent value.

The hardware processor 302 in an embodiment may execute machine readable code instructions of an OTB AI productivity tool 350 recommendation intent to capability determination module 352 to identify the AI productivity tool enableable software application 311 or the AI productivity tool enableable platform tool 380 natural language capability having a highest semantic similarity search score or capabilities exceeding a semantic similarity search score threshold as the best match capability or capabilities for the received intervention recommendation input. For example, the hardware processor 302 in an embodiment may execute machine readable code instructions of an OTB AI productivity tool 350 recommendation intent to capability determination module 352 to identify a best match capability of the AI productivity tool enableable software application 311 to perform a backup of data or increase the frequency of backups of all stored data in memory to a cloud-based location for remote access to a clone of the current OS for the information handling system. As yet another example, the hardware processor 302 in an embodiment may execute machine readable code instructions of an OTB AI productivity tool 350 recommendation intent to capability determination module 352 to identify a best match capability of the AI productivity tool enableable software application 311 to generate a purchase order for a replacement hardware component having the same model number as the failed or malfunctioning hardware component identified by the SIHA (295 of FIG. 2). In yet another example, the hardware processor 302 in an embodiment may execute machine readable code instructions of an OTB AI productivity tool 350 recommendation intent to capability determination module 352 to identify a best match capability of the AI productivity tool enableable software application 311 for providing a responsive set of instructions or a video instruction for replacing the drive memory such as a hard disk drive (HDD) (e.g., 120 in FIG. 1) or a solid state disk drive (e.g., 105 in FIG. 1) in the information handling system. In still another example, the hardware processor 302 in an embodiment may execute machine readable code instructions of an OTB AI productivity tool 350 recommendation intent to capability determination module 352 to identify a best match capability of the AI productivity tool enableable software application 311 to set a flag to automatically boot into basic input output system (BIOS) mode upon restarting of the information handling system, to facilitate BIOS level network connection to the cloned OS for the information handling system in order to ensure that failure of the hardware component does not impact productivity of the user.

In other cases, the hardware processor 302 in an embodiment may execute machine readable code instructions of an OTB AI productivity tool 350 recommendation intent to capability determination module 352 to identify a best match capability of the AI productivity tool enableable platform tool 380 to determine whether the network interface device 230 can be accessed in BIOS mode to establish a network connection to the cloned OS for the information handling system. The hardware processor 302 in an embodiment may execute machine readable code instructions of an OTB AI productivity tool 350 recommendation intent to capability determination module 352 to identify a best match capability of the AI productivity tool enableable platform tool 380 to retrieve network access credentials 283 for storage at an embedded controller random access memory (RAM) accessible by the AI productivity tool enableable platform tool 380 that may be used to provision the network interface device for network connection to the cloned OS for the information handling system while the information handling system operated in BIOS mode, at the platform level, below the OS.

As described herein, the recommended intervention actions in some embodiments may include adjustment of an adjustable problematic system configuration when one is identified within current telemetry. In such a case, the hardware processor 302 in an embodiment may execute machine readable code instructions of an OTB AI productivity tool 350 recommendation intent to capability determination module 352 to identify one or more best match capabilities of the AI productivity tool enableable platform tool 380 or the AI productivity tool enableable software application 311 to adjust the adjustable problematic system configuration when one is identified within current telemetry. For example, in an embodiment in which the hardware processor 302 executing machine readable code instructions for the automatic predictive capability recommendation system 390 identified a hardware policy setting as a problematic adjustable system configuration, the hardware processor 302 in an embodiment may execute machine readable code instructions of an OTB AI productivity tool 350 recommendation intent to capability determination module 352 to identify one or more best match capabilities of the AI productivity tool enableable platform tool 380 to adjust the hardware policy settings to avoid potential future failure of one or more hardware components or AI productivity tool enableable software application 311. As another example, in an embodiment in which the automatic predictive capability recommendation system 390 identified a background usage of the AI productivity tool enableable software application 311 as a problematic adjustable system configuration, the hardware processor 302 in an embodiment may execute machine readable code instructions of an OTB AI productivity tool 350 recommendation intent to capability determination module 352 to identify one or more best match capabilities of the AI productivity tool enableable software application 311 to adjust background usage of the AI productivity tool enableable software application 311 to avoid potential future failure of one or more hardware components, or AI productivity tool enableable software application 311.

In yet another example, in an embodiment in which the automatic predictive capability recommendation system 390 identified a software or firmware update method as a problematic adjustable system configuration, the hardware processor 302 in an embodiment may execute machine readable code instructions of an OTB AI productivity tool 350 recommendation intent to capability determination module 352 to identify one or more best match capabilities of the AI productivity tool enableable software application 311 or the AI productivity tool enableable platform tool 380 to adjust the software or firmware update methods to avoid potential future failure of one or more hardware components, or the AI productivity tool enableable software application 311. In still another example, in an embodiment in which the automatic predictive capability recommendation system 390 identified execution of the AI productivity tool enableable software application 311 or execution of a specific version of thereof or of firmware as a problematic adjustable system configuration, the hardware processor 302 in an embodiment may execute machine readable code instructions of an OTB AI productivity tool 350 recommendation intent to capability determination module 352 to identify one or more best match capabilities of the AI productivity tool enableable software application 311 or the AI productivity tool enableable platform tool 380 to update drivers or AI productivity tool enableable software applications 311, or termination of certain AI productivity tool enableable software applications 311 to avoid potential future failure of one or more hardware components or of the AI productivity tool enableable software application 311. In an embodiment in which one or more AI productivity tool enableable software applications 311 are using hardware resources at a maximum usage value (e.g., 85%), the hardware processor 302 in an embodiment may execute machine readable code instructions of an OTB AI productivity tool 350 recommendation intent to capability determination module 352 to identify one or more best match capabilities of the AI productivity tool enableable software application 311 or the AI productivity tool enableable platform tool 380 to decrease the usage of those hardware component resources for those specific AI productivity tool enableable software applications 311 by ten percent. As described above, these capabilities may be registered and associated with a specific AI productivity tool enableable software application 311 at the capability intent value database 356 in an embodiment.

Upon identification of one or more capabilities that address the determined intervention recommendation input intent within the received intervention recommendation input, the recommendation intent to capability determination module 352 in an embodiment may transmit the best match capability or capabilities for each identified intervention recommendation input received from the automatic predictive capability recommendation system 390 back to the automatic predictive capability recommendation system 390 for approval by the user. For example, as described in greater detail above with respect to FIG. 2, a text generation module may generate natural language text identifying a problematic adjustable system configuration and requesting user approval to execute the best match capabilities received from the recommendation intent to capability determination module 352. Upon receipt of such a user approval at the automatic predictive capability recommendation system 390, as described in greater detail above with respect to FIG. 2, the automatic predictive capability recommendation system 390 may direct the OTB AI productivity tool 350 to orchestrate execution of the user-approved best match capabilities by the AI productivity tool enableable software application 311 or the AI productivity tool enableable platform tool 380.

The hardware processor 302 executing machine-readable code instructions of the OTB AI productivity tool 350 may direct execution of one or more processes at the AI productivity tool enableable software application 311 or the AI productivity tool enableable platform tool 380 associated with the best match capability. For example, the hardware processor 302 executing machine-readable code instructions of the recommendation intent to capability determination module 352 may directly instruct the AI productivity tool enableable software application 311 or the AI productivity tool enableable platform tool 380 to undertake the identified capability. In such a way, the OTB AI productivity tool 350 may implement a number of actions or utilizes services of various software applications both within the OS and at a platform level below the OS based on the natural language of a received intervention recommendation input.

FIG. 4 is a flowchart 400 showing a method of executing computer readable code instructions of an automatic predictive capability recommendation system for automatically identifying a recommended intervention action of the information handling system via an OTB AI productivity tool to avoid recurrence of a detected error indicating a hardware, software, or firmware failure or malfunction according to an embodiment of the present disclosure. It is appreciated that the method 400 described herein may be executed via execution of computer readable program code instructions in firmware or software by a hardware processor or other hardware processing device such as an embedded controller on an information handling system.

The method 400 may include, at block 402, executing machine readable code instructions of an on the box (OTB) artificial intelligence (AI) productivity tool to gather firmware, hardware, and software capabilities for hardware components at the information handling system platform level, and AI productivity tool enableable software application executing at the operating system (OS) level, with natural language descriptions. For example, in an embodiment described with respect to FIG. 3, the hardware processor 302 may execute machine readable code instructions of the capabilities gathering module 353 of the OTB AI productivity tool 250 to gather firmware or hardware capabilities for a plurality of hardware components (e.g., 202, 203, 230 of FIG. 2) or capabilities of AI productivity tool-enableable software applications 211. These capabilities may be gathered in advance as determined by an enterprise ITDM or manufacturer for performing intervention recommendation actions according to embodiments herein. These gathered capabilities may then be later accessed upon execution of the automatic predictive capability recommendation system determining one or more intervention recommendations.

For example, the firmware or hardware capabilities may be stored within the natural language hardware capabilities database. These firmware or hardware capabilities may describe functionalities of each of the hardware components (e.g., 202, 203, 230 of FIG. 2) that may be used when interfacing with the AI productivity tool enableable platform tool 380. The natural language descriptions of the firmware or hardware capabilities for the hardware components may be stored for a semantic comparison, via the hardware processor 302 to received intervention recommendation inputs, for example, in order to identify a firmware or hardware capability at the information handling system platform level most likely to address the received intervention recommendation inputs.

A hardware processor executing machine readable code instructions of the operating system may gather capabilities for one or more AI productivity tool enableable software applications, with natural language descriptions. For example, in an embodiment described with respect to FIG. 3, a hardware processor 302 executing machine readable code instructions for an on the box (OTB) AI productivity tool 350 may gather, either in real-time or prior to execution of the OTB AI productivity tool 350, via the capabilities gathering module 353, capabilities associated with each of a plurality of AI productivity tool-enablable software applications 311, such as published by each of a plurality of AI productivity tool-enableable software applications 311. These capabilities may describe those functionalities of each of the AI productivity tool-enablable software applications 311, that may be used when interfacing with the OTB AI productivity tool 350. These natural language descriptions of the capabilities for the AI productivity tool-enableable software applications 311 may be stored within a natural language capability database 355 for comparison to received intervention recommendation inputs, for example, in order to identify a capability most likely to address the received intervention recommendation inputs.

At block 404, a hardware processor in an embodiment may execute machine readable code instructions of the OTB AI productivity tool at the operating system level to determine capability intent values associated with natural language descriptions of the gathered capabilities for each of a plurality of AI productivity tool-enablable software applications or the AI productivity tool-enableable platform tool. For example, the hardware processor 302 executing machine readable code instructions of the OTB AI productivity tool 350 may determine capability intent values associated with natural language descriptions of the gathered capabilities for each of a plurality of AI productivity tool-enablable software applications 311 and the AI productivity tool-enableable platform tool 380. These capability intent values are a mathematical representation of the natural language descriptions of capability operations or services from various AI productivity tool-enablable software applications 311 and the AI productivity tool-enableable platform tool 380 in an embodiment. These capability intent values may be represented by a mathematical value in a multi-axis vector space that may be associated with the natural language description for that capability or intent. In an embodiment, the capabilities may also be associated with an identification (ID) such as an alphanumeric ID that may be stored within a capability intent values database 356. These capabilities stored at the capability intent values database 356 may include any input and output capabilities provided by the AI productivity tool-enablable software applications 311 or the AI productivity tool-enableable platform tool 380 being executed by the hardware processor 302 or any other hardware processing devices, such as embedded controller 304. Generating such capability intent values as vectors may be a first step in a natural language processing method to determine a capability corresponding to and responsive to the requested action within an intervention recommendation input that takes into account the context or semantics of the words used within the intervention recommendation input.

At block 406, a hardware processor in an embodiment may execute machine readable code instructions of the platform level analytics module to track usage metrics of multiple hardware components in information handling system and to determine hardware and firmware configuration settings and policies. For example, in an embodiment described with respect to FIG. 2, a platform level analytics module 281 may be in communication with various hardware components (e.g., 202, 203, 230) and firmware for those components. The hardware processor 202 executing machine readable code instructions for the platform level analytics module 281 may monitor power consumption by each of the various hardware components (e.g., 202, 203, 230) in an embodiment, as well as thermal measurements made by the temperature monitor 294 at various locations throughout the information handling system 200. The hardware processor 202 executing machine readable code instructions for the platform level analytics module 281 in an embodiment may further track or monitor for firmware or hardware malfunctions or failures, including malfunctions or failures of the AI productivity tool enableable platform tool 280. In another example embodiment, the hardware processor 202 executing machine readable code instructions for the platform level analytics module 281 may also access firmware for hardware components (e.g., 202, 203, 230) to determine policies or settings for those components at the time of such power measurements. All information accessed in such a way by the hardware processor 202 executing machine readable code instructions for the platform level analytics module 281 in an embodiment may be communicated to a data collector 293.

At block 408, a hardware processor in an embodiment may execute machine readable code instructions of the event viewer to track software, hardware, or firmware failures or malfunctions. For example, the hardware processor 202 executing machine readable code instructions for the data collector 293 may gather information from an event viewer 291 (e.g., Microsoft® Event Viewer) tracking computing events relating to software, firmware, and hardware in real-time. Such events may include notification of errors relating to various attempted processes at the information handling system 200. More specifically, the hardware processor 202 executing machine readable code instructions for the event viewer 291 in an embodiment may record one or more Windows Hardware Error Architecture (WHEA) events indicating a hardware error. Such WHEA events may be associated with data packets that specifically identify the hardware component (e.g., 202, 203, 230) producing the error.

A hardware processor in an embodiment at block 410 may execute machine readable code instructions of the operating system (OS) level analytics module to track usage metrics of one or more AI productivity tool enableable software applications or other software applications. For example, the hardware processor 202 executing machine readable code instructions for the OS level analytics module 292 in an embodiment may track or monitor for software application malfunctions or failures, including malfunctions or failures of the AI productivity tool enableable software application 211. In an embodiment, the hardware processor 202 executing machine readable code instructions for the OS level analytics module 292 may monitor and adjust execution of software applications within the operating system (OS) for the information handling system 200. The hardware processor 202 executing machine readable code instructions for the OS level analytics module 292 in an embodiment may further track which software applications are running or idle (e.g., executing in the background) at various times, and track current versions of software applications and times at which updates to such software applications are performed. In still another example, the hardware processor 202 executing machine readable code instructions for the OS level analytics module 292 may determine current usage as a percentage of total capacity for memory 203, time required to process requests to access such memory 203, and identify software applications most frequently accessing such memory 203. Information gathered by the hardware processor 202 executing machine readable code instructions for the OS level analytics module 292 in such an embodiment may be communicated to the data collector 293.

In an embodiment at block 412, the hardware processor may execute machine readable code instructions of the data collector to gather event logs from analytics modules and event viewer and translate events into human and machine-readable code instructions, such as JavaScript Object Notation (JSON). For example, referring to FIG. 2, the hardware processor 202 executing machine readable code instructions for the data collector 293 may routinely collect information from each of the platform level analytics module 281, the OS level analytics module 292 or the event viewer 291 at preset intervals, or may do so upon notification by one of these modules (e.g., 281, 292, or 291) of a specific event, failure, or warning, such as a temperature measurement from temperature monitor 282 exceeding a preset maximum temperature threshold value. Information recorded by the hardware processor 202 executing machine readable code instructions for the event viewer 291 in an embodiment may be output in the form of a log, while information recorded by the platform level analytics module 281 or the OS level analytics module 292 may be output into reports. The format of such a log or report may vary, which may require reformatting of such information into an easily classified, sorted, and searchable format. Thus, the hardware processor 202 executing machine readable code instructions for the data collector 293 in an embodiment may operate to reformat any received logs or reports into a predetermined data interchange format such as JavaScript Object Notation (JSON), which may be readable by both machines and humans.

Such a JSON-formatted report or log may be referred to herein as a JSON event. Each JSON event may include any information gathered from the platform level analytics module 281, OS level analytics module 292, or event viewer 291 and a time stamp associated with either the time the analytics module report was generated, or the time at which a WHEA (or other known convention for categorizing processing events) error occurred. In some cases, a JSON event may include a single WHEA error (e.g., hardware processor error), or a single notification or warning from an analytics module (e.g., temperature monitor 282 recorded a temperature exceeding a preset maximum temperature threshold value). In other cases, a JSON event may include routinely gathered information such as current configurations or policies for various hardware components (e.g., 202, 203, 230) or software applications, power consumption of those components over a known monitoring time period, current versions of drivers or software applications, and timestamps for installation of updates to such drivers or software applications.

Such a JSON event may also include an event ID, a source for the event (e.g., platform level analytics module 281, OS level analytics module 292, or event viewer 291), a timestamp for that event, one or more custom flags identifying the errors, notifications, or warnings, and one or more device current states, identifying the software and hardware configurations. The JSON event may further include any number of other errors, notifications, warnings, hardware configurations, software performance analytics, or descriptions of policies in place for hardware or software at the information handling system 200, as monitored by either the platform level analytics module 281 or the OS level analytics module 292. Some JSON events in an embodiment may indicate a hardware failure, such as "WHEA_error," having a value of CPU, indicating a failure at the CPU. In embodiments where a JSON event indicating a hardware error identified by the systems internal health assessor (SIHA) 295 appear, the JSON event may comprise a failure operational telemetry for the information handling system 200. Some JSON events in an embodiment may represent adjustable system configurations that may correlate with hardware, software, or firmware failures in an embodiment.

In an embodiment, the hardware processor 202 executing machine readable code instructions for the data collector 293 may operate to analyze the contents of the JSON event comprising failure operational telemetry, and to classify the type of JSON event. Classification types may be preset according to instructions received by the hardware processor 202 executing machine readable code instructions for the automatic predictive capability recommendation system 290 and may assist the hardware processor 202 executing machine readable code instructions for the systems internal health assessor 295 in determining a probability that a given adjustable system configuration described by a JSON event comprising failure operational telemetry will co-occur in future JSON events with a given hardware, software, or firmware failure indicator, as described in greater detail below. In example embodiments, classification types, such as software resource use, hardware configuration, or driver performance, may be preset and available for use in classifying JSON events received from the data collector 293. In an example embodiment, the hardware processor 202 executing machine readable code instructions for the data collector 293 in an embodiment may analyze the JSON event comprising failure operational telemetry described above to identify whether any of the JSON events and values associated with preset incident classifiers appear within the JSON event.

At block 414, the hardware processor in an embodiment may execute machine readable code instructions of the data collector to store the JSON event in telemetry. For example, all JSON events generated as described above with respect to block 412, which may include software, firmware, or hardware failures or malfunctions, may be transmitted from the data collector 293 to the telemetry data store 294 for storage. The hardware processor 202 executing machine readable code instructions for the automatic predictive capability recommendation system 290 operating at the information handling system 200 in an embodiment may be in communication with telemetry data store 294. Each classified JSON event comprising failure operational telemetry thus received in an embodiment may be stored in telemetry data store 294 for later analysis by the hardware processor 202 executing machine readable code instructions for the Systems Internal Health Assessor (SIHA) 295 or the automatic predictive capability recommendation system 290. In another aspect, the telemetry data store 294 may also include results of benchmark testing performed at the enterprise management system (e.g., 198 of FIG. 1) for each of a plurality of information handling systems, including 200, in an embodiment. As described herein, the hardware processor 202 executing machine readable code instructions for the platform level analytics module 281 may test the performance of one or more hardware components (e.g., 202, 203, 230) by executing sample tasks similar to tasks performed by those devices routinely. The hardware processor 202 executing machine readable code instructions for the platform level analytics module 281 may assign a test benchmark score for each tested hardware component (e.g., 202, 203, 230), based on the speed and accuracy with which each component completes these basic tasks.

The hardware processor in an embodiment at block 416 may execute machine readable code instructions of Systems Internal Health Assessor (SIHA) to identify a JSON event as indicating hardware, firmware, or software failure or malfunction. For example, the hardware processor 202 executing machine readable code instructions for the systems internal health assessor (SIHA) 295 in an embodiment may identify the classified JSON event comprising failure operational telemetry described above as indicating failure of an AI productivity tool enableable software application 211, or a hardware component (e.g., 202, 203, 230) of a given hardware type, or substantial functional inefficiency or malfunction of the same. For example, the hardware processor 202 executing machine readable code instructions for the SIHA 295 in an embodiment may search the classified JSON event comprising failure operational telemetry described above, which has been stored in telemetry data store 294 to identify the JSON event named "WHEA_Error," having a value CPU for the hardware processor 202, indicating an error, such as a substantial inefficiency in the function at the CPU or hardware processor 202. In another embodiment, the hardware processor 202 executing machine readable code instructions for the SIHA 295 in an embodiment may search the classified JSON event comprising failure operational telemetry described above, which has been stored in telemetry data store 294 to identify the JSON event named "WHEA_Error," having a value "drive memory," "HDD," or "static memory" for the memory drive hardware (e.g., 120 in FIG. 1) or for static memory (e.g., 105 in FIG. 1), indicating an error, such as a substantial inefficiency in the function or imminent failure at the drive memory or static memory. Upon identification of such an error associated with an identified hardware component, the hardware processor 202 executing machine readable code instructions for the SIHA 295 may transmit a notification to the automatic predictive capability recommendation system 290 that the classified JSON event comprising failure operational telemetry indicates poor health of a hardware component.

At block 418, the hardware processor in an embodiment may execute machine readable code instructions of the classification supervised learning algorithm of the automatic predictive capability recommendation system to identify probability that an adjustable system configuration will co-occur in the future with a specific type of software, firmware, or hardware failure or malfunction. For example, referring to FIG. 2, the hardware processor 202 executing machine readable code instructions for the automatic predictive capability recommendation system 290 in an embodiment may perform a classification supervised learning algorithm upon the failure operational telemetries identified by the SIHA 295 as indicating hardware, software, or firmware failures to identify a probability that an adjustable system configuration represented by a custom flag or a device current state within a JSON event will co-occur in the future with the specific type of hardware, software, or firmware failure identified by the SIHA 295.

The hardware processor 202 executing machine readable code instructions for the automatic predictive capability recommendation system 290 in an embodiment may train a machine-learning classifier executing a classification supervised learning algorithm based on the JSON events comprising failure operational telemetries known to describe hardware, software, or firmware failures in order to identify other JSON events (e.g., describing hardware, software, or firmware, usage or configurations, otherwise referred to herein as adjustable system configurations) that may routinely co-occur with JSON events identifying the known hardware, software, or firmware failures. More specifically, the hardware processor 202 executing machine readable code instructions for the automatic predictive capability recommendation system 290 in an embodiment may train a machine-learning classifier to determine a probability that any given JSON event within the JSON events comprising failure operational telemetries identified by the SIHA 295, or any sequence of given JSON events within the JSON events identified by the SIHA 295, as indicating hardware, software, or firmware failure will co-occur in the future with the same type of hardware, software, or firmware failure. The hardware processor 202 executing machine readable code instructions for the automatic predictive capability recommendation system 290 in an embodiment may perform this assignment of probabilities throughout many iterations performed across several JSON events identified by the hardware processor 202 executing machine readable code instructions for the SIHA 295 as identifying a hardware, software, or firmware failure during a training process.

The hardware processor in an embodiment at block 420 may execute machine readable code instructions of the automatic predictive capability recommendation system to identify one or more recommended intervention actions of the information handling system for avoiding recurrence of the error. These recommended intervention actions in some cases may include an adjustable system configuration that is associated with a probability of future co-occurrence with the specific type of software, firmware, or hardware failure or malfunction that meets a preset failure probability threshold identified as an adjustable problematic system configuration. For example, the hardware processor 202 executing machine readable code instructions for the automatic predictive capability recommendation system 290 in an embodiment may identify one or more recommended intervention actions of the information handling system 200 for avoiding recurrence of the error identified by the SIHA 295 at block 416. In an embodiment, the hardware processor 202 executing machine readable code instructions for the automatic predictive capability recommendation system 290 may feed the telemetry identified by the hardware processor 202 executing machine readable code instructions for the SIHA 295 as containing an error indicating hardware, firmware, or software failure or malfunction into a trained neural network to determine such a recommended intervention action of the information handling system 200 for avoiding recurrence of the error. The input layer for such a neural network may include all telemetry data included within such received JSON events from the plurality of information handling systems, including 200, indicating configurations, policies, power consumption, usage statistics, and error warnings. The output layer of the neural network may provide one or more recommended intervention actions of the information handling system 200 for avoiding recurrence of the error identified within the input JSON event.

Example recommended intervention actions for the information handling system 200 in an embodiment may include any actions supported or executable by the AI productivity tool enablable software application 211, or the AI productivity tool platform tool 280, or by the user via communication with the information handling system 200 using the universal user conversational interface software application 270. In some embodiments, the hardware processor 202 executing machine readable code instructions for the automatic predictive capability recommendation system 290 in an embodiment may identify an adjustable system configuration represented by a custom flag or a device current state within a JSON event comprising failure operational telemetries that, alone or as part of a sequence of JSON events, is associated with a probability of future co-occurrence with the specific type of hardware, software, or firmware failure that meets a preset failure probability threshold as an adjustable problematic system configuration. The hardware processor 202 executing machine readable code instructions for the automatic predictive capability recommendation system 290 executing a classification supervised learning algorithm in an embodiment may produce a probability that any given JSON event identifying an adjustable system configuration or combination of such JSON events will co-occur in the future with another JSON event in a sequence indicating hardware, software, or firmware failure. For example, the hardware processor 202 executing machine readable code instructions for the automatic predictive capability recommendation system 290 may identify a JSON event or a combination of JSON events associated with a probability for co-occurrence with a future hardware, software, or firmware failure that meets or exceeds a preset failure probability threshold value (e.g., 90%, 95%, 98%, 99%). Any JSON event identified in such a way by the hardware processor 202 executing machine readable code instructions for the automatic predictive capability recommendation system 290 in an embodiment may be labeled as a problematic adjustable system configuration.

Following such an identification of problematic adjustable system configurations in an embodiment, the hardware processor 202 executing machine readable code instructions for the automatic predictive capability recommendation system 290 may routinely monitor future performance of the information handling system 200 to identify such problematic adjustable system configurations before a similar hardware, firmware, or AI productivity tool enableable software application 211 failure occurs, in order to prevent such an occurrence.

As described herein, when an occurrence of one or more problematic adjustable system configurations (e.g., combinations of usage and configurations) are detected in current telemetry, the hardware processor 202 executing machine readable code instructions for the automatic predictive capability recommendation system 290 may recommend adjustments to such adjustable system configurations (e.g., hardware, software, or firmware usage or configuration) to avoid the potential hardware, firmware, or software failure previously caused by such a combination, prior to its occurrence. Various hardware, firmware, or AI productivity tool enableable software application 211 policy settings in an embodiment may be determined to be an adjustable problematic system configuration in an embodiment, due to high demands on various hardware components. Execution of background software applications, including AI productivity tool enableable software application 211 in an embodiment may also be determined to be an adjustable problematic system configuration in an embodiment. These background software application executions may be identified with reference to the JSON event described above, and stored in telemetry data store 294. Methods for AI productivity tool enableable software application 211 and firmware updates in an embodiment may also be determined to be an adjustable problematic system configuration in an embodiment. Execution of specific AI productivity tool enableable software applications 211 or specific versions thereof or of firmware drivers in an embodiment may also be determined to be an adjustable problematic system configuration in an embodiment. Consumption of power for a specific hardware component (e.g., 202, 203, 230) may also be determined to be an adjustable problematic system configuration in an embodiment.

In an embodiment in which the hardware processor 202 executing machine readable code instructions for the automatic predictive capability recommendation system 290 identified a hardware policy setting as a problematic adjustable system configuration, the hardware processor 202 executing machine readable code instructions for the automatic predictive capability recommendation system 290 may recommend adjustment to the hardware policy settings to avoid potential future failure of one or more hardware components (e.g., 202, 203, 230) or AI productivity tool enableable software application 211. As another example, in an embodiment in which the automatic predictive capability recommendation system 290 identified a background usage of the AI productivity tool enableable software application 211 as a problematic adjustable system configuration, the hardware processor 202 executing machine readable code instructions for the automatic predictive capability recommendation system 290 may recommend adjustment to the background usage of the AI productivity tool enableable software application 211 to avoid potential future failure of one or more hardware components (e.g., 202, 203, 230), or AI productivity tool enableable software application 211.

In yet another example, in an embodiment in which the automatic predictive capability recommendation system 290 identified a software or firmware update method as a problematic adjustable system configuration, the hardware processor 202 executing machine readable code instructions for the automatic predictive capability recommendation system 290 may recommend adjustment to the software or firmware update methods to avoid potential future failure of one or more hardware components (e.g., 202, 203, 230), or the AI productivity tool enableable software application 211. In still another example embodiment, the automatic predictive capability recommendation system 290 identifies execution of the AI productivity tool enableable software application 211 or execution of a specific version of thereof, execution of other software, or execution of firmware as a problematic adjustable system configuration. Then the hardware processor 202 executing machine readable code instructions for the automatic predictive capability recommendation system 290 may recommend an installation of updated drivers, AI productivity tool enableable software applications 211, or other software or firmware, or recommend a termination of certain AI productivity tool enableable software applications 211, software or firmware to avoid potential future failure of one or more hardware components or of the AI productivity tool enableable software application 211. In an embodiment in which one or more AI productivity tool enableable software applications 211 or other software are using hardware resources at a maximum usage value (e.g., 85%), the hardware processor 202 executing machine readable code instructions for the automatic predictive capability recommendation system 290 may recommend decreasing the usage of those hardware component resources for those specific AI productivity tool enableable software applications 211 or software applications by ten percent. In such a way, the hardware processor 202 executing machine readable code instructions for the automatic predictive capability recommendation system 290 may recommend adjustments to such hardware (e.g., 202, 203, or 230), AI productivity tool enableable software applications 211, other software, or firmware usage or configuration to avoid the potential hardware, firmware, or software failure previously caused by such a combination, prior to its occurrence.

At block 422, the automatic predictive capability recommendation system may determine whether the error identified by the SIHA at block 416 above indicates imminent failure of a hard drive or other hardware component. This specific type of error in an embodiment may prompt specific actions to be taken by the user, in addition to actions taken by the AI productivity tool enableable software application and the AI productivity tool enableable platform tool. If the hardware processor executing machine readable code instructions of the automatic predictive capability recommendation system determines that the error identified by the SIHA at block 416 above indicates imminent failure of a hard drive or other hardware component, the method may proceed to block 424 for recommendation of such additional actions by the user. If the hardware processor executing machine readable code instructions of the automatic predictive capability recommendation system determines that the error identified by the SIHA at block 416 above does not indicate imminent failure of a hard drive or another hardware component, the method may proceed to block 426 for generation of a natural language text excerpt of the recommended intervention actions identified at block 420.

In an embodiment at block 424 in which the hardware processor executing machine readable code instructions of the automatic predictive capability recommendation system determines that the error identified by the SIHA at block 416 above indicates imminent failure of a hardware component such as a hard drive, the hardware processor may execute machine readable code instructions of the automatic predictive capability recommendation system to recommend that the user order a new hard drive or other hardware component (e.g., static drive, RAM memory, battery, or other). In an example embodiment where the hardware component is a hard drive (or static drive or RAM memory), the intervention recommendations generated by the automatic predictive capability recommendation system in such an embodiment may further include a recommendation to automatically backup the system and user data to the cloud, and to reboot into basic input output system (BIOS) mode for automatic network connectivity to cloud-based environment as a remote terminal. For example, the hardware processor 202 executing machine readable code instructions for the automatic predictive capability recommendation system 290 in an embodiment may recommend physical replacement of a hardware component (e.g., 202, 203, 230), or maintenance, repair, or cleaning of such hardware component, which may include a fan in some embodiments. As another example, the hardware processor 202 executing machine readable code instructions for the automatic predictive capability recommendation system 290 in an embodiment may recommend performing a backup or increasing the frequency of backups of all stored data in memory 203 to a cloud-based location for remote access to a clone of the current OS for the information handling system 200, via the AI productivity tool enableable software application 211. As yet another example, the hardware processor 202 executing machine readable code instructions for the automatic predictive capability recommendation system 290 in an embodiment may recommend automatically generating a purchase order for a replacement hardware component having the same model number as the failed or malfunctioning hardware component identified by the SIHA 295, via the AI productivity tool enableable software application 211. In yet another example, the hardware processor 202 in an embodiment may automatically providing a responsive set of instructions or a video instruction for replacing the drive memory such as a hard disk drive (HDD) (e.g., 120 in FIG. 1) or a solid state disk drive (e.g., 105 in FIG. 1) in the information handling system. In still another example, the hardware processor 202 executing machine readable code instructions for the automatic predictive capability recommendation system 290 in an embodiment may recommend setting a flag to automatically boot into basic input output system (BIOS) mode upon restarting of the information handling system 200, to facilitate BIOS level network connection to the cloned OS for the information handling system 200 in order to ensure that failure of the hardware component does not impact productivity of the user, via the AI productivity tool enableable software application 211.

In other cases, the hardware processor 202 executing machine readable code instructions for the automatic predictive capability recommendation system 290 in an embodiment may recommend determining, via the AI productivity tool enableable platform tool 280 executing at a platform level below the OS level, whether the network interface device 230 can be accessed in BIOS mode to establish a network connection to the cloned OS for the information handling system 200. The hardware processor 202 executing machine readable code instructions for the automatic predictive capability recommendation system 290 in an embodiment may recommend retrieving, via the AI productivity tool enableable platform tool 280, network access credentials 283 for storage at an random access memory (RAM) accessible by an embedded controller executing the AI productivity tool enableable platform tool 280 that may be used to provision the network interface device 230 for network connection to the cloned OS for the information handling system 200 while the information handling system 200 operated in BIOS mode, at the platform level, below the OS. The method may then proceed to block 426 for generation of natural language text describing the intervention recommendation identified at block 420 and any associated recommendations, such as those identified at block 424.

At block 426, the hardware processor executing machine readable code instructions of the text generation module may generate natural language text for the one or more recommended intervention actions of the information handling system for avoiding recurrence of the error. For example, the hardware processor 202 executing machine readable code instructions of the text generation module 297 may generate a natural language text description for each of the one or more recommended intervention actions of the information handling system for avoiding recurrence of the error determined by the automatic predictive capability recommendation system 290. As described in greater detail below with respect to FIG. 5, the recommendation intent to capability determination module 252 may generate a vectorized recommendation intent value for each of these natural language descriptions, and compare these vectorized recommendation intent values against a plurality of capability intent values stored in the capability intent values database 256 for capabilities of the AI productivity tool enableable software application 211 and the AI productivity tool platform tool 280. Such a comparison may yield one or more best match responsive capabilities for each of the natural language descriptions of the recommended intervention actions of the information handling system for avoiding recurrence of the error, if available. In such a way, the automatic predictive capability recommendation system 290 may identify code instructions of capabilities for the AI productivity tool enableable software application 211 or for the AI productivity tool enableable platform tool 280 that may be automatically executed, with user notification and user approval by the OTB AI productivity tool 250, to perform the recommended intervention action for avoiding recurrence of the error indicating failure or malfunction of hardware, firmware, or software identified above.

The hardware processor executing machine readable code instructions of the text generation module 297 in an embodiment may translate a portion of one or more JSON events, such as an error code, error classification, warning flag, or any combination thereof, as well as a recommended intervention action or actions for avoiding recurrence of such an error, as identified by the automatic predictive capability recommendation system 290 into human-understandable and conversation text, phrases, or sentences. The hardware processor 202 executing machine readable code instructions of the text generation module 297 may then transmit the human-understandable and conversation text, phrases, or sentences recommended execution of the recommended intervention action or actions for avoidance of recurrence of the error to the automatic predictive capability recommendation system 290 in the OTB AI productivity tool module 250. The method for identifying a recommended action of the information handling system to avoid recurrence of a detected error indicating a hardware, software, or firmware failure or malfunction in an embodiment may then end.

Figure 5:
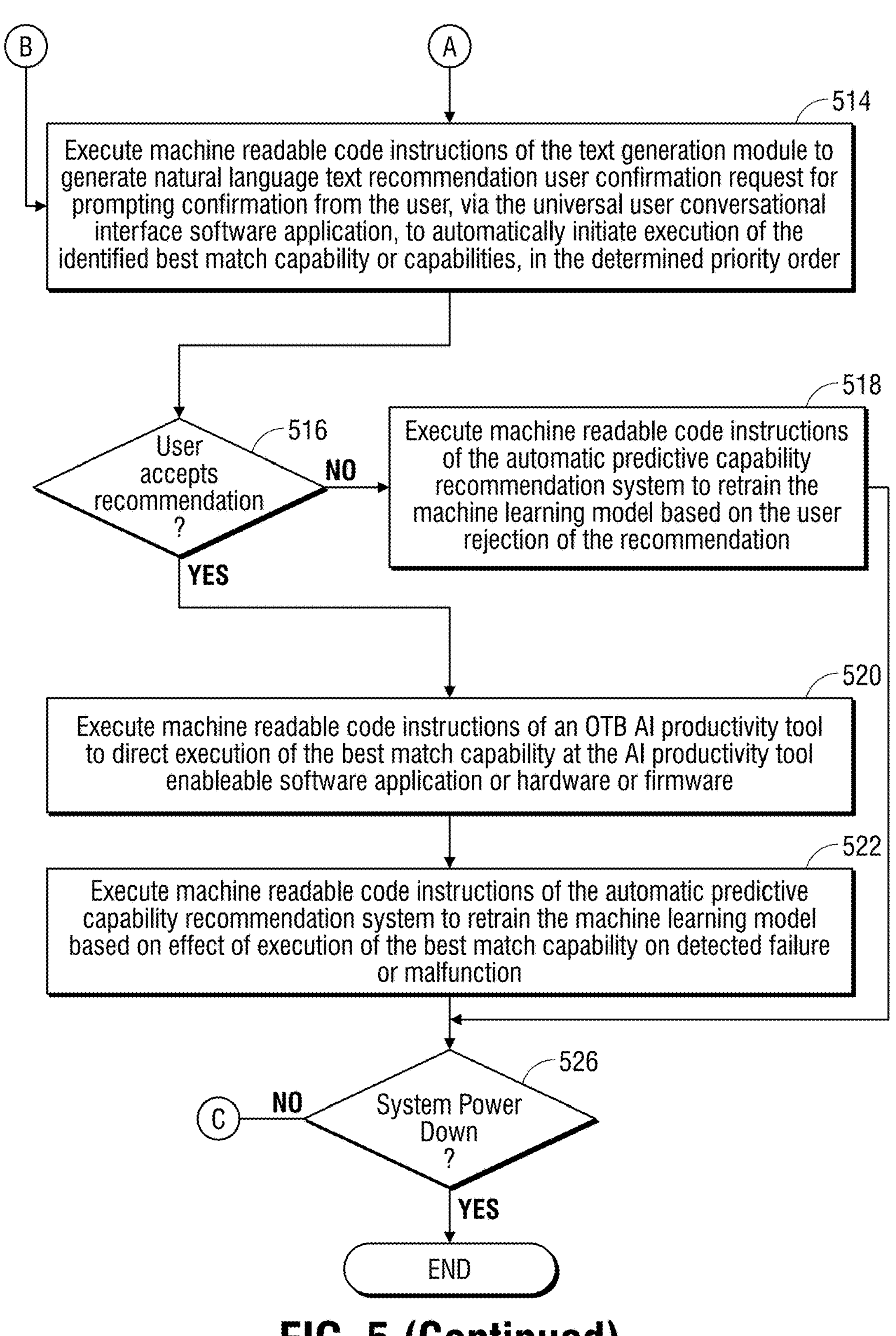
FIG. 5 is a flowchart showing a method of executing computer readable code instructions of a best match capability of an AI productivity tool enableable software application or an AI productivity tool platform tool pursuant to a recommended action to avoid recurrence of a detected hardware, software, or firmware failure or malfunction according to an embodiment of the present disclosure.

FIG. 5 is a flowchart 500 showing a method of executing a best match responsive capability of an AI productivity tool enableable software application or an AI productivity tool platform tool to execute a recommended intervention capability intent action of the information handling system to avoid recurrence of a detected error indicating a hardware, software, or firmware failure or malfunction according to an embodiment of the present disclosure. It is appreciated that the method 500 described herein may be executed via execution of computer readable program code instructions in firmware or software by a hardware processor or other hardware processing device such as an embedded controller on an information handling system and may execute one or more best match responsive capabilities to execute one or more recommended intervention actions.

At block 502, the hardware processor in an embodiment may execute machine readable code instructions of the automatic predictive capability recommendation system to transmit a natural language text description of the one or more recommended intervention actions of the information handling system for avoiding recurrence of the error and any associated recommendations to the recommendation intent to a capability determination module. For example, in an embodiment described with respect to FIG. 2, the hardware processor 202 executing machine readable code instructions of the text generation module 297 may generate and transmit to the recommendation intent to capability determination module 252 a natural language text description for each of the one or more recommended intervention actions of the information handling system for avoiding recurrence of the error determined by the automatic predictive capability recommendation system 290. The recommendation intent to capability determination module 252 may generate a vectorized recommendation intent value for each of these natural language descriptions, and compare these vectorized recommendation intent values against a plurality of capability intent values stored in the capability intent values database 256 for capabilities of the AI productivity tool enableable software application 211 and the AI productivity tool platform tool 280, as described in greater detail in embodiments herein. Such a comparison may yield one or more best match responsive capabilities for each of the natural language descriptions of the recommended intervention actions of the information handling system for avoiding recurrence of the error, if available. In such a way, the automatic predictive capability recommendation system 290 may identify code instructions for the AI productivity tool enableable software application 211 or for the AI productivity tool enableable platform tool 280 that may be automatically executed, with user notification and user approval by the OTB AI productivity tool 250, to perform the recommended intervention action for avoiding recurrence of the error indicating failure or malfunction of hardware, firmware, or software identified above.

The hardware processor operating at the operating system level in an embodiment at block 504 may execute machine readable code instructions of an OTB AI productivity tool text embedding module to generate a vector recommendation intent value for the received intervention recommendation input determined from the automatic predictive capability recommendation system. For example, in an embodiment described with respect to FIG. 3 the hardware processor 302 may execute machine-readable code instructions of the recommendation intent determination module 351 to receive the intervention recommendation input from the automatic predictive capability recommendation system 390, and initiate execution of machine readable code instructions for an intent recognition pipeline machine learning module 361. In an embodiment, the hardware processor 302 executing machine-readable code instructions for the intent recognition pipeline machine learning module 361 may further orchestrate any combination of a plurality of machine learning modules (e.g., 365, or 366) to determine the intended goal or recommendation intent within the received intervention recommendation input.

During operation for example, the hardware processor 302 executing machine-readable code instructions of the recommendation intent determination module 351 may load one or more machine learning models such that, for example, the text intervention recommendation input may be processed through any of a plurality of natural language models (e.g., 365 or 366) or other ML models in order to determine a text of an intervention recommendation input or an intent value of the intervention recommendation input. For example, a text embedding module 365, or a semantic similarity search module 366 may work in various combinations with one another to convert to text or to detect text, and determining an intent represented by generating a recommendation intent vector value from the text of the intervention recommendation input received from the automatic predictive capability recommendation system 390. Further, the hardware processor 302 executing machine-readable code instructions of an intent recognition pipeline machine learning module 361 may orchestrate the interplay between each of the text embedding module 365, and semantic similarity search module 366 to establish a recommendation intent vector value in a multi-axis vector space defined with these machine learning models and correlate that recommendation intent value with a corresponding capability intent value in an embodiment. The hardware processor 302 executing machine-readable code instructions of the intent recognition pipeline machine learning module 361 in an embodiment may apply the text embedding module 365 to generate a recommendation intent value as described and then return the output recommendation intent value of the text embedding module 365 to the recommendation intent to capability determination module 352 in an embodiment.

At block 506, the hardware processor in an embodiment may execute machine readable code instructions of an OTB AI productivity tool semantic similarity search module to perform a semantic similarity search algorithm comparing the vector recommendation intent value against each of the plurality of capability intent values associated with AI productivity tool enableable software application and AI productivity tool enableable platform tool natural language capability descriptions. For example, in reference to an embodiment described with reference to FIG. 3, a hardware processor 302 may execute machine readable code instructions for a semantic similarity search module 366, via a recommendation intent to capability module 352, that compares the vectorized intervention recommendation input intent value and the capability intent values stored within the capability intent values database 356. Such a comparison may be performed using a semantic search machine learning model, such as a cosine or other semantic similarity search algorithm that compares the distance or value difference in a multi-axis vector space between two vectors to determine the contextual similarity between the natural language description of the embedded text algorithm generated capabilities having the capability intent values and the natural language intervention recommendation input having an intervention recommendation input intent value generated from an embedded text algorithm. Such a contextual or semantic search machine learning model may take into account the fact that the same word may have two meanings or consider synonyms of words, for example based on generated intent values of multiple words or recognized phrases or parts of speech that yield the vector intent value from the text embedding algorithm machine learning models used to generate capability and recommendation intent vector values. The cosine similarity search comparison or other semantic similarity search algorithm may be performed for several of the capability intent values stored within the capability intent value database 356 to identify a best match capability intent value that most closely matches the intervention recommendation input value, according to embodiments herein. In other embodiments, the cosine similarity search comparison or other semantic similarity search algorithm may be performed for several of the capability intent values stored within the capability intent value database 356 to identify one or more best match capability intent values that exceed a threshold correlation level indicating a close match to the intervention recommendation input value, according to embodiments herein.

A hardware processor 302 executing machine readable code instructions for a semantic similarity search module 366 may determine a distance, that is a value difference of the vector intent values within the multi-axis vector space between the intervention recommendation input intent value and each of a plurality of capability intent values. Then, for each of those determined distances, the hardware processor executing machine readable code instructions for a semantic similarity search module 366 may determine an angular similarity having a value between zero and one for the intervention recommendation input intent value and each of a plurality of capability intent values. This angular similarity value in an embodiment may comprise the semantic similarity search score for a given capability intent value, where zero is a lowest matching correlation and one is a highest matching correlation between the given capability intent value and the intervention recommendation input intent value.

The hardware processor in an embodiment at block 508 may execute machine readable code instructions of an OTB AI productivity tool recommendation intent to capability determination module to identify the AI productivity tool enableable software application or AI productivity tool enableable platform tool natural language capability having a highest semantic similarity search score as a best match responsive capability for the received intervention recommendation input. In other embodiments, OTB AI productivity tool recommendation intent to capability determination module identifies the AI productivity tool enableable software application or AI productivity tool enableable platform tool natural language capabilities having a semantic similarity search score above a threshold score level as one or more best match responsive capabilities for the received intervention recommendation input. For example, in an embodiment described with reference to FIG. 3, the recommendation intent to capability module 352 may utilize the semantic similarity search module 366 for a correlation between the recommendation intent value received and a stored capability intent value for a capability. More specifically, the hardware processor 302 in an embodiment may execute machine readable code instructions of an OTB AI productivity tool 350 recommendation intent to capability determination module 352 to identify one or more best match responsive capabilities of the AI productivity tool enableable software application 311 to perform a backup of data or increase the frequency of backups of all stored data in memory to a cloud-based location for remote access to a clone of the current OS for the information handling system. As yet another example, the hardware processor 302 in an embodiment may execute machine readable code instructions of an OTB AI productivity tool 350 recommendation intent to capability determination module 352 to identify one or more best match responsive capabilities of the AI productivity tool enableable software application 311 to generate a purchase order for a replacement hardware component having the same model number as the failed or malfunctioning hardware component identified by the SIHA (295 of FIG. 2). In yet another example, the hardware processor 302 in an embodiment may execute machine readable code instructions of an OTB AI productivity tool 350 recommendation intent to capability determination module 352 to identify a best match capability of the AI productivity tool enableable software application 311 for providing a responsive set of instructions or a video instruction for replacing the drive memory such as a hard disk drive (HDD) (e.g., 120 in FIG. 1) or a solid state disk drive (e.g., 105 in FIG. 1) in the information handling system. In still another example, the hardware processor 302 in an embodiment may execute machine readable code instructions of an OTB AI productivity tool 350 recommendation intent to capability determination module 352 to identify one or more best match responsive capabilities of the AI productivity tool enableable software application 311 to set a flag to automatically boot into basic input output system (BIOS) mode upon restarting of the information handling system, to facilitate BIOS level network connection to the cloned OS for the information handling system in order to ensure that failure of the hardware component does not impact productivity of the user.

In other cases, the hardware processor 302 in an embodiment may execute machine readable code instructions of an OTB AI productivity tool 350 recommendation intent to capability determination module 352 to identify one or more best match responsive capabilities of the AI productivity tool enableable platform tool 380 to determine whether the network interface device 230 can be accessed in BIOS mode to establish a network connection to the cloned OS for the information handling system. The hardware processor 302 in an embodiment may execute machine readable code instructions of an OTB AI productivity tool 350 recommendation intent to capability determination module 352 to identify one or more best match responsive capabilities of the AI productivity tool enableable platform tool 380 to retrieve network access credentials 283 for storage at an embedded controller random access memory (RAM) accessible by the AI productivity tool enableable platform tool 380 that may be used to provision the network interface device for network connection to the cloned OS for the information handling system while the information handling system operated in BIOS mode, at the platform level, below the OS.

As described herein, the recommended intervention actions in some embodiments may include adjustment of an adjustable problematic system configuration when one is identified within current telemetry. In such a case, the hardware processor 302 in an embodiment may execute machine readable code instructions of an OTB AI productivity tool 350 recommendation intent to capability determination module 352 to identify one or more best match responsive capabilities of the AI productivity tool enableable platform tool 380 or the AI productivity tool enableable software application 311 to adjust the adjustable problematic system configuration when one is identified within current telemetry. For example, in an embodiment in which the hardware processor 302 executing machine readable code instructions for the automatic predictive capability recommendation system 390 identified a hardware policy setting as a problematic adjustable system configuration, the hardware processor 302 in an embodiment may execute machine readable code instructions of an OTB AI productivity tool 350 recommendation intent to capability determination module 352 to identify one or more best match responsive capabilities of the AI productivity tool enableable platform tool 380 to adjust the hardware policy settings to avoid potential future failure of one or more hardware components or AI productivity tool enableable software application 311. As another example, in an embodiment in which the automatic predictive capability recommendation system 390 identified a background usage of the AI productivity tool enableable software application 311 as a problematic adjustable system configuration, the hardware processor 302 in an embodiment may execute machine readable code instructions of an OTB AI productivity tool 350 recommendation intent to capability determination module 352 to identify one or more best match responsive capabilities of the AI productivity tool enableable software application 311 to adjust background usage of the AI productivity tool enableable software application 311 to avoid potential future failure of one or more hardware components, or AI productivity tool enableable software application 311.

In yet another example, in an embodiment in which the automatic predictive capability recommendation system 390 identified a software or firmware update method as a problematic adjustable system configuration, the hardware processor 302 in an embodiment may execute machine readable code instructions of an OTB AI productivity tool 350 recommendation intent to capability determination module 352 to identify one or more best match responsive capabilities of the AI productivity tool enableable software application 311 or the AI productivity tool enableable platform tool 380 to adjust the software or firmware update methods to avoid potential future failure of one or more hardware components, or the AI productivity tool enableable software application 311. In still another example, in an embodiment in which the automatic predictive capability recommendation system 390 identified execution of the AI productivity tool enableable software application 311 or execution of a specific version of thereof or of firmware as a problematic adjustable system configuration, the hardware processor 302 in an embodiment may execute machine readable code instructions of an OTB AI productivity tool 350 recommendation intent to capability determination module 352 to identify one or more best match responsive capabilities of the AI productivity tool enableable software application 311 or the AI productivity tool enableable platform tool 380 to update drivers or AI productivity tool enableable software applications 311, or termination of certain AI productivity tool enableable software applications 311 to avoid potential future failure of one or more hardware components or of the AI productivity tool enableable software application 311. In an embodiment in which one or more AI productivity tool enableable software applications 311 are using hardware resources at a maximum usage value (e.g., 85%), the hardware processor 302 in an embodiment may execute machine readable code instructions of an OTB AI productivity tool 350 recommendation intent to capability determination module 352 to identify one or more best match responsive capabilities of the AI productivity tool enableable software application 311 or the AI productivity tool enableable platform tool 380 to decrease the usage of those hardware component resources for those specific AI productivity tool enableable software applications 311 by ten percent. As described above, these capabilities may be registered and associated with a specific AI productivity tool enableable software application 311 at the capability intent value database 356 in an embodiment.

At block 510, the hardware processor executing machine readable code instructions for the automatic predictive capability recommendation system may determine whether more than one best match capability has been identified at block 508. For example, in some cases, as described in an embodiment with respect to FIG. 2, the hardware processor executing machine readable code instructions for the automatic predictive capability recommendation system 290 may identify more than one recommended intervention action for avoiding recurrence of an error indicating failure or malfunction of hardware, firmware, or software. This may be the case, for example, when the trained neural network of the automatic predictive capability recommendation system 290 generates an output layer having more than one recommended intervention action. In such a case, each of these outputs may be accompanied by a weighting value indicating the strength of prediction that any given output recommended intervention action may successfully avoid recurrence of such an error. In such an embodiment, the hardware processor executing machine readable code instructions for the automatic predictive capability recommendation system 290 may identify output recommended intervention actions having a weighting value above a preset minimum threshold, such as, for example, 80%. If more than one best match capability has been identified, the method may proceed to block 512 for determination of a priority order for the execution of these best match capabilities. If more than one best match capability has not been identified, the method may proceed to block 514 for generation of a text recommendation, readable by a user, to execute the best match capability.

At block 512, in an embodiment in which more than one best match capability has been identified as meeting a threshold correlation score with at least one recommended intervention action, the hardware processor may execute machine readable code instructions of a machine learning model of automatic predictive capability recommendation system to determine a priority of execution for the plurality of best match capabilities. For example, the hardware processor executing machine readable code instructions for the automatic predictive capability recommendation system 290 may rank of prioritize these plural output recommended intervention actions based on their associated weightings. More specifically, an output recommended intervention action having a highest weighting (e.g., closest to 100%) may be prioritized as first in line for execution, followed by each consecutively lower weighting value for each of the other recommended intervention actions. The method may then proceed to block 514 for generation of a text recommendation, readable by a user, to identify an error condition or problem adjustable configuration and to execute each of the best match responsive capabilities, in the determined priority order. In other embodiments, the priority order of best match responsive capabilities may be dictated by intervention policy priority controls that require certain recommended intervention actions occur in a specified order. For example, intervention policy priority controls may require reboot to BIOS prior to other actions or reboot back to OS in particular order or may require data backup before hardware replacement in some embodiments.

The hardware processor in an embodiment at block 514 may execute machine readable code instructions of the text generation module to generate a natural language text recommendation user confirmation request for requesting confirmation from the user, via the universal user conversational interface software application, to automatically initiate execution of the identified best match responsive capability or capabilities, in the determined priority order. For example, the hardware processor 202 executing machine readable code instructions of the automatic predictive capability recommendation system 290 may then transmit the human-understandable and conversation text, phrases, or sentences describing in natural language the recommended intervention action for avoidance of recurrence of the error to the universal user conversational interface software application 270 for display to the user. Execution of computer readable code instructions by a hardware processor of an LLM of a text generation module may generate a prompt to the user via the universal user conversational interface software application in text in a graphical user interface or via an audio output in some embodiments. The prompt may include identification or description of the error condition, failure operational telemetry, or problematic system configuration as well as one or more recommendation intervention actions in an embodiment. The prompt may further include a request for approval to execute one or more best match capabilities for performing the one or more recommendation intervention actions in embodiments herein.

At block 516, the hardware processor may execute machine readable code instructions of the automatic predictive capability recommendation system to determine whether the user has accepted the recommendation to execute one or more best match responsive capabilities. Acceptance of the recommendation may further trigger execution of the identified best match responsive capabilities, and may be used to retrain the neural network generating such recommendations to indicate user approval. If the user has accepted the recommendation, the method may proceed to block 520 for execution of the user-approved best match responsive capability or capabilities. If the user has not accepted the recommendation, the method may proceed to block 518 for retraining of the neural network based on the user rejection of the recommendation.

In an embodiment at block 518 in which the user has not accepted the recommended intervention action having a best match capability, the hardware processor may execute machine readable code instructions of the automatic predictive capability recommendation system to retrain the machine learning model based on the user rejection of the recommendation. For example, if a user of one of the information handling systems, including 200, whose telemetry data is used to train the neural network refuses to execute the recommended intervention actions, this user refusal may be used to retune weight matrices of the multi-layered neural network. More specifically, user rejection of execution of a recommended intervention action may decrease weighting for one or more nodes in weight matrices of the neural network to lessen a likelihood that the same intervention action may be recommended in the future where the same error is detected. The method may then proceed to block 524 to determine if the information handling system has been shut down, and if not to continue to monitor telemetry data for predicting further recommendation intervention actions at block 502 in the future.

At block 520, in an embodiment in which the user has accepted the recommended intervention action having a best match capability, the hardware processor may execute machine readable code instructions of an OTB AI productivity tool to direct execution of the best match capability at the AI productivity tool enableable software application or hardware or firmware. For example, upon user approval of the recommended intervention action via the universal user conversational interface software application 270, the hardware processor 202 may execute machine readable code instructions of the automatic predictive capability recommendation system 290 to execute the best match responsive capabilities for each of the recommended interventions actions to avoid recurrence of the error, via the OTB AI productivity tool 250, the AI productivity tool enableable software application 211 or the AI productivity tool enableable platform tool 280 according to embodiments herein.

The hardware processor in an embodiment at block 522 may execute machine readable code instructions of the automatic predictive capability recommendation system to retrain the machine learning model based on the effect of execution of the best match responsive capability on detected failure or malfunction. For example, upon execution of such a recommendation at one or more of the plurality of information handling systems, including 200, the results of such an execution (e.g., satisfactory or unsatisfactory resolution or avoidance of recurrence of the detected error) may be used to retune weight matrices of the multi-layered neural network to more accurately predict in the future other recommended intervention actions. More specifically, successful resolution or avoidance of recurrence of a detected error through execution of a recommended intervention action may increase weighting for one or more nodes in weight matrices of the neural network to strengthen a likelihood that the same intervention action may be recommended in the future where the same error is detected. As another example, unsuccessful resolution or avoidance of recurrence of a detected error through execution of a recommended intervention action may decrease weighting for one or more nodes in weight matrices of the neural network to lessen a likelihood that the same intervention action may be recommended in the future where the same error is detected.

At block 524, it may be determined whether the system has powered down. For example, the hardware processor 302 in an embodiment may execute machine readable code instructions of the automatic predictive capability recommendation system 390 to determine whether the information handling system has shut down, and to routinely perform telemetry analysis as described herein when still powered on. If the information handling system has not been powered down, the method may return to block 502 for continued monitoring for recommended intervention actions from identified future failures or malfunctions of hardware, software, or firmware. Execution of machine readable code instructions for the data collector and the SIHA may continue to monitor for JSON events indicating further software application, hardware, or firmware failure or malfunction. For example, the hardware processor 202 in an embodiment described at FIG. 2 may execute machine readable code instructions for the data collector 293 and the SIHA 295 to continue to monitor for JSON events indicating further software application, hardware, or firmware failure or malfunction. If the information handling system has been powered down, the method may then end.

The blocks of the flow diagram of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing computer readable code instructions for an on the box (OTB) artificial intelligence (AI) productivity tool comprising:

a hardware processor executing computer-readable code instructions of an automatic predictive capability recommendation system to receive failed operational telemetries including an error indicating a software, firmware, or hardware failure or malfunction;

the hardware processor executing computer-readable code instructions of an automatic predictive capability recommendation system trained neural network to determine that the error indicates imminent failure of a hard disk drive (HDD) or a solid state disk drive (SSDD) and identify a recommendation intervention action;

the hardware processor executing computer-readable code instructions of text generation module to generate a natural language description of the recommendation intervention action to replace the HDD or the SSDD predicted to fail;

the hardware processor executing computer-readable program code instructions for generating a recommendation input intent value for the natural language description of the recommendation intervention action to replace the HDD or the SSDD and performing a semantic similarity search comparing the recommendation input intent value to a plurality of capability intent values generated from the-gathered natural language descriptions of application, firmware, and hardware capabilities associated with each of a plurality of AI productivity tool enableable software applications or an AI productivity tool enableable platform tool and stored via a natural language capabilities database; and the hardware processor executing computer-readable program code instructions for identifying and executing a best match responsive capability for performing the recommendation intervention action to replace the HDD or the SSDD having a capability intent value that generates a threshold level semantic similarity search score or a highest semantic similarity search score.

2. The information handling system of claim 1, wherein the failed operational telemetries are for the information handling system and include platform level analytics, operating system (OS) level analytics, and event viewer error logs.

3. The information handling system of claim 1, wherein the best match responsive capability includes backing up to a remote cloud-based storage device data stored on the HDD or the SSDD that is predicted to fail.

4. The information handling system of claim 1, wherein the best match responsive capability includes generating and transmitting a purchase order form for a replacement HDD or replacement SSDD of the same model as the HDD or SSDD that is predicted to fail.

5. The information handling system of claim 1 further comprising:

the hardware processor executing computer-readable program code instructions of an AI productivity tool enableable platform tool to install a network software layer executing below an operating system (OS) layer of the information handling system within a basic input output system (BIOS) for the information handling system for automatically booting to the BIOS and establishing a network connection to a cloud-based backup for the OS when the HDD or the SSDD fails.

6. The information handling system of claim 1 further comprising:

the hardware processor executing machine readable code instructions of the text generation module to generate a natural language text of the error and the recommendation intervention action for notification to a user via a universal user conversational interface.

7. The information handling system of claim 1 further comprising:

the hardware processor executing machine readable code instructions of the text generation module to generate natural language text prompting a user with a user confirmation request for approval to execute the best match responsive capability to perform the recommendation intervention action.

8. A method for automatically backing up data stored on a hard disk drive (HDD) or solid state disk drive (SSDD) of an information handling system predicted to imminently fail comprising:

accessing, via a natural language capabilities database, gathered natural language descriptions of application, firmware, and hardware capabilities associated with each of a plurality of AI productivity tool enableable software applications or an AI productivity tool enableable platform tool;

receiving, via the hardware processor executing computer-readable code instructions of an automatic predictive capability recommendation system, failed operational telemetries including an error indicating a software, firmware, or hardware failure or malfunction;

determining, via the hardware processor executing computer-readable code instructions of a trained neural network for the automatic predictive capability recommendation system, that the error indicates imminent failure of a hard disk drive (HDD) or a solid state disk drive (SSDD) and identifying a recommendation intervention action to replace the HDD or the SSDD;

generating, via the hardware processor executing computer-readable code instructions of text generation module, a natural language description of a the recommendation intervention action to replace the HDD or the SSDD predicted to fail;

generating, via the hardware processor executing computer-readable program code instructions, a recommendation input intent value for the natural language description of the recommendation intervention action to replace the HDD or the SSDD and performing a semantic similarity search comparing the recommendation input intent value to a plurality of capability intent values generated from the gathered natural language descriptions of application, firmware, and hardware capabilities; and identifying and executing, via the hardware processor executing computer-readable program code instructions, best match responsive capabilities for the received-natural language description of the recommendation intervention action to replace the HDD or the SSDD having capability intent values that generates a threshold level semantic similarity search score, wherein the best match responsive capabilities include backing up to a remote cloud-based storage device data stored on the HDD or SSDD that is predicted to fail.

9. The method of claim 8 further comprising:

installing, via the hardware processor executing computer-readable program code instructions of an AI productivity tool enableable platform tool, a network software layer executing below an operating system (OS) layer of the information handling system within a basic input output system (BIOS) for the information handling system for automatically booting to the BIOS and establishing a network connection to a cloud-based backup for the OS as one of a plurality of the best match responsive capabilities.

10. The method of claim 8 further comprising:

provisioning, via the hardware processor executing computer-readable program code instructions of an AI productivity tool enableable platform tool, a network software layer within a basic input output system (BIOS) for the information handling system with BIOS network credentials for automatically booting to the BIOS and establishing a network connection to a cloud-based backup for an operating system of the information handling system as one of a plurality of the best match responsive capabilities.

11. The method of claim 8 further comprising:

executing, via the hardware processor executing computer-readable code instructions of the automatic predictive capability recommendation system, a classification supervised learning algorithm on the failed operational telemetries to determine a failure probability, meeting a preset failure probability threshold value, that the HDD or SSDD will imminently fail.

12. The method of claim 8 further comprising:

generating, via the hardware processor executing machine readable code instructions of the text generation module, a natural language text of the error and the recommendation intervention action for notification to a user via a universal user conversational interface.

13. The method of claim 8 further comprising:

generating, via the hardware processor executing machine readable code instructions of the text generation module, a natural language text prompting a user with a user confirmation request for approval to execute the best match responsive capability to perform the recommendation intervention action.

14. The method of claim 8 further comprising:

executing computer-readable code instructions of the trained neural network of the automatic predictive capability recommendation system to determine a priority of execution of the best match responsive capabilities for performance of the recommendation intervention actions of the information handling system for avoiding occurrence of the error.

15. An information handling system executing computer readable code instructions for an on the box (OTB) artificial intelligence (AI) productivity tool comprising:

a hardware processor executing computer-readable code instructions of an automatic predictive capability recommendation system to receive failed operational telemetries including an error indicating a software, firmware, or hardware failure or malfunction;

the hardware processor executing computer-readable code instructions of a trained neural network of the automatic predictive capability recommendation system to determine that the error indicates imminent failure of a hard disk drive (HDD) or solid state disk drive (SSDD) and identify a recommendation intervention action to replace the HDD or the SSDD;

the hardware processor executing computer-readable code instructions of text generation module to generate a natural language description of the recommendation intervention action to replace the HDD or the SSDD predicted to fail and generate natural language text prompting a user confirmation request for approval to perform the recommendation intervention action;

the hardware processor executing computer-readable program code instructions for generating a recommendation input intent value for the natural language description of the recommendation intervention action to replace the HDD or SSDD and performing a semantic similarity search comparing the recommendation input intent value to a plurality of capability intent values generated from gathered natural language descriptions of application, firmware, and hardware capabilities associated with each of a plurality of AI productivity tool enableable software applications or an AI productivity tool enableable platform tool and stored in a natural language capabilities database;

the hardware processor executing computer-readable program code instructions for identifying and executing a best match responsive capability for the recommendation intervention action to replace the HDD or SSDD having a capability intent value that generates a highest semantic similarity search score or exceeds threshold level semantic similarity score; and the hardware processor executing computer-readable program code instructions of an AI productivity tool enableable platform tool for backing up to a remote cloud-based storage device data stored on the HDD or the SSDD predicted to fail as the best match capability upon an approval user query input received from a user.

16. The information handling system of claim 15 further comprising:

the hardware processor executing computer-readable code instructions of the trained neural network for the automatic predictive capability recommendation system to determine a priority of execution for a plurality of the best match capabilities for the recommendation intervention action of the information handling system for avoiding occurrence of the error.

17. The information handling system of claim 15 further comprising:

the hardware processor executing computer-readable program code instructions of an AI productivity tool enableable platform tool to provision a network software layer executing below an operating system (OS) layer of the information handling system within a basic input output system (BIOS) for the information handling system for automatically booting to the BIOS and establishing a network connection to a cloud-based backup for the OS if the HDD or the SSDD fails.

18. The information handling system of claim 15, wherein the best match responsive capability includes providing a responsive set of instructions for replacing the HDD or the SSDD in the information handling system.

19. The information handling system of claim 15, wherein the best match responsive capability includes increasing a previously user-specified frequency for backing up to a remote cloud-based storage device data stored on the HDD or SSDD that is predicted to fail.

20. The information handling system of claim 15, wherein the best match responsive capability includes generating and transmitting a purchase order form for a replacement HDD or replacement SSDD of the same model as the HDD or SSDD that is predicted to fail.

* * * * *